(12) United States Patent
Gerard et al.

(10) Patent No.: US 10,065,872 B2
(45) Date of Patent: Sep. 4, 2018

(54) SURFACE-TREATED CALCIUM CARBONATE AND PHYLLOSILICATE AND ITS USE IN WATER PURIFICATION

(71) Applicant: Omya International AG, Oftringen (CH)

(72) Inventors: Daniel Edward Gerard, Basel (CH); Martine Poffet, Berne (CH); Joachim Schoelkopf, Oberkulm (CH); Michael Skovby, Meilen (CH); Patrick Arthur Charles Gane, Rothtist (CH)

(73) Assignee: Omya International AG, Oftringen (CH)

(*) Notice: Subject to any disclaimer, the term of this patent is extended or adjusted under 35 U.S.C. 154(b) by 218 days.

(21) Appl. No.: 14/782,044

(22) PCT Filed: Apr. 14, 2014

(86) PCT No.: PCT/EP2014/057521
§ 371 (c)(1),
(2) Date: Oct. 2, 2015

(87) PCT Pub. No.: WO2014/180631
PCT Pub. Date: Nov. 13, 2014

(65) Prior Publication Data
US 2016/0060143 A1  Mar. 3, 2016

Related U.S. Application Data

(60) Provisional application No. 61/822,941, filed on May 14, 2013.

(30) Foreign Application Priority Data

May 7, 2013  (EP) .................................. 13166922

(51) Int. Cl.
| | | |
|---|---|---|
| *C02F 1/52* | (2006.01) | |
| *C02F 1/28* | (2006.01) | |
| *C02F 11/12* | (2006.01) | |
| *C02F 1/56* | (2006.01) | |
| *C02F 11/14* | (2006.01) | |
| *C02F 101/30* | (2006.01) | |
| *C02F 101/32* | (2006.01) | |
| *C02F 103/22* | (2006.01) | |
| *C02F 103/24* | (2006.01) | |
| *C02F 103/28* | (2006.01) | |
| *C02F 103/32* | (2006.01) | |
| *C02F 101/10* | (2006.01) | |
| *C02F 103/00* | (2006.01) | |

(52) U.S. Cl.
CPC ............ *C02F 1/5236* (2013.01); *C02F 1/288* (2013.01); *C02F 1/5263* (2013.01); *C02F 1/56* (2013.01); *C02F 11/14* (2013.01); *C02F 2101/10* (2013.01); *C02F 2101/30* (2013.01); *C02F 2101/301* (2013.01); *C02F 2101/305* (2013.01); *C02F 2101/308* (2013.01); *C02F 2101/32* (2013.01); *C02F 2103/007* (2013.01); *C02F 2103/22* (2013.01); *C02F 2103/24* (2013.01); *C02F 2103/28* (2013.01); *C02F 2103/32* (2013.01)

(58) Field of Classification Search
CPC ........ C02F 1/5236; C02F 1/5263; C02F 1/56; C02F 11/14; C02F 1/288; C02F 2103/007; C02F 2101/10; C02F 2101/308; C02F 2101/32; C02F 2101/301; C02F 2101/30; C02F 2103/22; C02F 2103/24; C02F 2103/28; C02F 2103/32; C02F 2101/305
See application file for complete search history.

(56) References Cited

U.S. PATENT DOCUMENTS

| | | |
|---|---|---|
| 6,666,953 B1 | 12/2003 | Gane et al. |
| 2004/0020410 A1 | 2/2004 | Gane et al. |
| 2006/0162884 A1 | 7/2006 | Gane et al. |
| 2006/0273039 A1 | 12/2006 | Young |
| 2009/0270543 A1 | 10/2009 | Mongoin et al. |

(Continued)

FOREIGN PATENT DOCUMENTS

| | | | | |
|---|---|---|---|---|
| CA | 2734310 A1 | * | 9/2011 | ................ C02F 1/56 |
| EP | 0273335 A2 | | 7/1988 | |

(Continued)

OTHER PUBLICATIONS

Machine Translation EP0273335 (1988) (original foreign language document submitted by applicant without machine translation).*

(Continued)

*Primary Examiner* — Pamela H Weiss
(74) *Attorney, Agent, or Firm* — Amster, Rothstein & Ebenstein LLP

(57) ABSTRACT

The invention relates to a process for the purification of water and/or dewatering of sludges and/or sediments, to the use of a combination of a phyllosilicate and a surface-treated calcium carbonate for water purification and/or dewatering of sludges and/or sediments, as well as to the use of a combination of a phyllosilicate and a surface-treated calcium carbonate for reducing the amount of polymeric flocculation aids in water and/or sludges and/or sediments and to a composite material comprising at least one surface-treated calcium carbonate, at least one phyllosilicate and impurities originated from different sources obtainable by said process.

27 Claims, No Drawings

(56) References Cited

U.S. PATENT DOCUMENTS

| | | | | |
|---|---|---|---|---|
| 2010/0133195 A1* | 6/2010 | Gane | ............... | B01J 20/043 |
| | | | | 210/667 |
| 2011/0158890 A1* | 6/2011 | Gane | ............... | C01F 11/183 |
| | | | | 423/432 |
| 2013/0164411 A1* | 6/2013 | Skovby | ............... | C02F 1/68 |
| | | | | 426/66 |

FOREIGN PATENT DOCUMENTS

| | | | |
|---|---|---|---|
| EP | 1493716 | A1 | 1/2005 |
| EP | 1974807 | A1 | 10/2008 |
| EP | 1982759 | A1 | 10/2008 |
| EP | 2011766 | A1 | 1/2009 |
| EP | 2264108 | A1 | 12/2010 |
| EP | 2264109 | A1 | 12/2010 |
| EP | 2565165 | A1 | 3/2013 |
| EP | 2589430 | A1 | 5/2013 |
| WO | 0039222 | A1 | 7/2000 |
| WO | 2004043865 | A2 | 5/2004 |
| WO | 2004083316 | A1 | 9/2004 |
| WO | 2005121257 | A2 | 12/2005 |
| WO | 2009074492 | A1 | 6/2009 |
| WO | 2011127425 | A1 | 10/2011 |
| WO | WO 2012020056 A1 * | 2/2012 | ............... C02F 1/68 |

OTHER PUBLICATIONS

Enhanced adsorptoin of natural organic matter on calcium caronbate particles through surface charge modification by Mustafa Bob and Harold W Walker Colloids and Surfaces a Physiochemical and Engineering Aspects 191 (2001) p. 17-25.*

International Search Report dated May 21, 2004 for PCT Application No. PCT/US2014/057521.

Written Opinion of the International Searching Authority dated May 21, 2004 for PCT Application No. PCT/US2014/057521.

* cited by examiner

SURFACE-TREATED CALCIUM CARBONATE AND PHYLLOSILICATE AND ITS USE IN WATER PURIFICATION

CROSS-REFERENCE TO RELATED APPLICATIONS

This is a U.S. national phase of PCT Application No. PCT/EP2014/057521, filed Apr. 14, 2014, which claims priority to European Application No. 13166922.8, filed May 7, 2013 and U.S. Provisional Application No. 61/822,941, filed May 14, 2013.

The invention relates to a process for the purification of water and/or dewatering of sludges and/or sediments, to the use of a combination of a phyllosilicate and a surface-treated calcium carbonate for water purification and/or dewatering of sludges and/or sediments, as well as to the use of a combination of a phyllosilicate and a surface-treated calcium carbonate for reducing the amount of polymeric flocculation aids in water and/or sludges and/or sediments and to a composite material comprising at least one surface-treated calcium carbonate, at least one phyllosilicate and impurities originated from different sources obtainable by said process.

Water pollution has posed a serious problem all over the world. In this regard, water pollution is suggested as being the leading cause of death and diseases in developing countries but also industrialized countries continue struggling with such pollution problems. In general, water, sludges and sediments are referred to as being polluted when impaired by anthropogenic contaminants and either does not support a human use, such as serving as drinking water, and/or has negative impacts on aquatic and/or land based flora and fauna.

The specific contaminants or impurities leading to pollution in water, sludges and sediments, include a wide variety of chemical substances, pathogens and physical or sensory changes such as elevated temperature and discoloration. In this regard, the chemical contaminants may include organic substances as well as inorganic substances. In particular, many of the inorganic components may also be naturally occurring (calcium salts, sodium salts, manganese salts etc.) so that their concentration is often the key in determining what is a natural water, sludge, or sediment component and what is a contaminant. Sources of such water, sludge or sediment pollutions typically originate from urban waste waters, i.e. domestic waste water or a mixture of domestic waste water with industrial waste water and/or run-off rain water, as well industrial waste waters, i.e. any waste water which is discharged from premises used for carrying on any trade or industry.

In the art, several approaches for the purification of polluted water, sludges or sediments have been proposed. For instance, one approach involves the addition of flocculants to remove or at least to reduce the amount of contaminants such as fine solids, microorganisms and dissolved inorganic and organic materials. Flocculation refers to a process where dissolved compounds and/or colloidal particles are removed from the solution in the form of flocs or "flakes." The term is also used to refer to the process by which fine particulates are caused to clump together into flocs. The flocs may then float to the top of the liquid, settle to the bottom of the liquid, or can be readily filtered from the liquid.

Flocculants, or flocculating agents, are chemicals that are used to promote flocculation. Flocculants are used in water treatment processes to improve the sedimentation or filterability of small particles. Many flocculants are multivalent cations such as aluminium, iron, calcium or magnesium. These positively charged ions interact with negatively charged particles and molecules to reduce the barriers to aggregation. In addition, many of these chemicals, under appropriate pH and other conditions, react with water to form insoluble hydroxides which, upon precipitating, link together to form long chains or meshes, physically trapping small particles into the larger floc.

Common flocculants or coagulants used are aluminium sulphate or polyaluminium chloride (PAC). Aluminium sulphate reacts with water to form flocs of aluminium hydroxide. Coagulation with aluminum compounds may leave a residue of aluminium in the finished water, which can be toxic to humans at high concentrations. In solutions of polyaluminium chloride (PAC), aluminium ions have formed into polymers consisting of clusters of ions bridged by oxygen atoms. PAC is used e.g. for the treatment of brown drinking water comprising organic materials such as leaves and/or inorganic materials such as iron and manganese compounds which cause the brown discolouration. However, PAC is generally not sufficient to remove all brown discolouration from the water.

Iron(III) chloride is another common coagulant. Iron(III) coagulants work over a larger pH range than aluminium sulphate but are not effective with many source waters. Coagulation with iron compounds typically leaves a residue of iron in the finished water. This may impart a slight taste to the water, and may cause brownish stains on porcelain fixtures. Furthermore, iron(III) chloride impart corrosion risks in the water treatment system.

Further well-known flocculants for the water treatment based on a high specific surface area such as activated carbon or bentonite have the general drawback that they are very difficult to separate after the adsorption of the substance to be removed from the medium due to their finely divided state.

The skilled man also knows US 2006/0273039 A1, which refers to a product and an apparatus for cleaning water or industrial and sewage waste water includes a mixture of diatomite that is heated and stirred to impart an enhanced negative electrical charge to the diatomite. EP 2 0111 766 A1 relates to a process for reducing the amount of organic components in water, wherein a surface-reacted natural calcium carbonate and a hydrophobic adsorbent, selected from the group consisting of talc, hydrophobised calcium carbonate, hydrophobised bentonite, hydrophobised kaolinite, hydrophobised glass, or any mixture thereof, are brought into contact with the water to be purified, the surface-reacted natural calcium carbonate being the reaction product of a natural calcium carbonate with an acid and carbon dioxide, which is formed in situ by the acid treatment and/or supplied externally, and the surface-reacted natural calcium carbonate being prepared as an aqueous suspension having a pH of greater than 6.0, measured at 20° C. EP 1 982 759 A1 relates to a process for the purification of water, wherein a surface-reacted natural calcium carbonate is brought into contact with the water to be purified, the surface-reacted natural calcium carbonate being the reaction product of a natural calcium carbonate with an acid and carbon dioxide, which is formed in situ by the acid treatment and/or supplied externally. EP 1 974 807 A1 relates to the removal of endocrine disrupting compounds from an aqueous medium by adding surface-reacted natural calcium carbonate or an aqueous suspension comprising surface-reacted calcium carbonate and having a pH greater than 6.0 measured at 20° C., to the medium, wherein the surface-reacted calcium carbonate is a reaction product of natural calcium carbonate with carbon dioxide and one or more acids. EP 1 974 806 A1 relates to a process for the purification of water by adding surface-reacted natural calcium carbonate or an aqueous suspension comprising surface-reacted calcium carbonate and having a pH greater than 6.0 measured at 20° C., to the medium, wherein the surface-reacted calcium carbonate is a reaction product of natural calcium carbonate with carbon dioxide and one or more acids. EP 1 493 716 A1 refers to a wastewater treatment process, wherein wastewater containing fluoride ion and/or phosphate ion is added with a calcium-containing compound, and then added with a film-forming agent and complexion agent.

One problem with the addition of such flocculants, however, is that it tends to merely bind and agglomerate organic contaminants while inorganic impurities are still finely dispersed in the water sample. Furthermore, the flocculated material needs to be removed from the water phase by a dewatering process such as filtration or centrifugation so that the obtained filter cake can be further disposed by e.g. burning. However, due to the overall incomplete flocculation process the water content in such obtained filter cake is comparatively high resulting in a dramatically increased energy consumption on combustion.

Another strategy involves the use of polymeric flocculation aids in conjunction with other inorganic flocculants. However, when used in combination with one of the above-mentioned inorganic flocculants such as iron(III) chloride, the polymeric flocculation aid needs to be cationic, i.e. needs to have a positive overall charge, for effectively acting as a flocculation aid. The long chains of positively charged polymers can help to strengthen the floc making it larger, faster settling and easier to filter out. Due to the restriction to cationic polymers, the process flexibility is reduced.

A known polymeric flocculation aid is polyacrylamide. By using of specific comonomers, anionic as well as cationic, polyacrylamide can be provided. However, as already indicated above, when used in combination with inorganic flocculants such as iron(III) chloride, only cationic polyacrylamide is effective.

However, one problem with this approach is that these polymeric flocculation aids are usually overdosed to a large extent in order to ensure the agglomeration of all fine solid particles in the water to be treated. Thus, after the separation of the flocculated material from the water phase, the content of polyacrylamide in the filtrate is usually increased due to the high amounts of polymeric flocculating aids used. However, as there are severe environmental concerns regarding water containing polymeric flocculation aids, and especially polyacrylamide, the filtrate cannot be readily disposed in nature and, thus, further time and cost consuming purification steps are required to remove the polymeric flocculation aid from the filtrate.

Therefore, there is a continuous need for alternative water treatment processes, which provide a better performance than existing processes and effectively decrease the concentration of impurities and especially inorganic impurities and the concentration of polymeric flocculation aids in waste water to be treated but still enables easy performance at low cost.

This and other objects are solved by the subject-matter of the present invention. According to a first aspect of the present invention, a process for the purification of water and/or dewatering of sludges and/or sediments, comprising the following steps of a) providing water to be purified and/or sludge and/or sediment to be dewatered comprising impurities;

b) providing at least one surface-treated calcium carbonate, wherein at least 1% of the accessible surface area of the calcium carbonate is covered by a coating comprising at least one cationic polymer, c) providing at least one phyllosilicate, and d) contacting the water and/or sludge and/or sediment of step a) with the at least one surface-treated calcium carbonate of step b) and the at least one phyllosilicate of step c) for obtaining a composite material comprising the at least one surface-treated calcium carbonate, the at least one phyllosilicate and impurities.

The inventors surprisingly found that the foregoing process according to the present invention leads to an improved quality of the purified water providing a lower amount of polymeric flocculation aids than water, sludges and/or sediments treated the same way but without contacting it with the at least one surface-treated calcium carbonate and the at least one phyllosilicate (step c)). More precisely, the inventors found that the quality of water obtained by a purification process can be improved by the defined addition of at least one calcium carbonate that is surface-treated with cationic polymers in combination with at least one phyllosilicate. Furthermore, the inventors found that the dewatering of sludges and/or sediments can be improved or facilitated by the defined addition of at least one calcium carbonate that is surface-treated with cationic polymers in combination with at least one phyllosilicate.

It should be understood that for the purposes of the present invention, the following terms have the following meaning:

The term "purification" in the meaning of the present invention refers to the removal of harmful compounds and/or other compounds not tolerated in the water. Furthermore, the term refers to the reduction in concentration of naturally occurring compounds in the water.

The term "dewatering" in the meaning of the present invention refers to the removal of residual liquid from sludges and/or sediments.

The term "impurities" in the meaning of the present invention refers to naturally occurring compounds, wherein their concentration in the water and/or sludge and/or sediment is above the natural concentration and/or compounds that are not naturally occurring.

The term "calcium carbonate" in the meaning of the present invention refers to ground or natural calcium carbonate (GCC), and/or synthetic or precipitated calcium carbonate (PCC) and/or surface modified calcium carbonate (MCC). "Ground calcium carbonate" (GCC) in the meaning of the present invention is a calcium carbonate obtained from natural sources, such as limestone, marble or chalk or dolomite, and processed through a treatment such as grinding, screening and/or fractionizing by a wet and/or dry process, for example, by means of a cyclone or classifier. "Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water. "Surface-modified calcium carbonate" (MCC) in the meaning of the present invention refers to a natural calcium carbonate and/or precipitated calcium carbonate obtained by reacting it with an acid or ion and with carbon dioxide prior to the preparation of the surface-treated calcium carbonate, wherein the carbon dioxide is formed in situ by the acid treatment and/or is supplied from an external source.

The term "surface-treated" calcium carbonate in the meaning of the present invention refers to a ground calcium carbonate and/or precipitated calcium carbonate and/or surface-modified calcium carbonate that has been processed with cationic polymers through an additional treatment step in order to render the surface of the calcium carbonate particles more cationic.

The term "cationic polymer" in the meaning of the present invention refers to any polymer providing for a positive overall charge when bound to calcium carbonate particles. Thus, the presence of anionic monomer units is not excluded as long as there are still sufficient cationic monomer units providing a positive overall charge.

The same applies for amphoteric polymers which provide for an overall positive charge when bound to the calcium carbonate particles.

The term "accessible surface area" in the meaning of the present invention refers to the surface of the calcium carbonate particle that is accessible or exposed to the cationic polymer applied by mixing and/or coating techniques known to the skilled person and thereby forming a monolayer of cationic polymer on the surface of the calcium carbonate particle. In this regard, it should be noted that the amount of cationic polymer required for full saturation of the accessible surface area is defined as a monolayer concentration. Higher concentrations thus can be chosen thereby forming bilayered or multi-layered structures on the surface of the calcium carbonate particle. Such monolayer concentrations can be readily calculated by the skilled person, based on the publication of Papirer, Schultz and Turchi (Eur. Polym. J., Vol. 20, No. 12, pp. 1155-1158, 1984).

The term "phyllosilicate" in the meaning of the present invention refers to any sheet silicate mineral.

Another aspect of the present invention is directed to the use of a combination of a phyllosilicate and a surface-treated calcium carbonate for water purification and/or dewatering of sludges and/or sediments, wherein at least 1% of the accessible surface area of the calcium carbonate is covered by a coating comprising at least one cationic polymer. A further aspect of the present invention is directed to the use of a combination of a phyllosilicate and a surface-treated calcium carbonate for reducing the amount of polymeric flocculation aids in water and/or sludges and/or sediments, wherein at least 1% of the accessible surface area of the calcium carbonate is covered by a coating comprising at least one cationic polymer.

It is preferred that the surface-treated calcium carbonate comprises ground calcium carbonate and/or precipitated calcium carbonate and/or surface-modified calcium carbonate, preferably surface-modified calcium carbonate. It is still further preferred that the coating of the surface-treated calcium carbonate comprises at least one cationic polymer a) having a positive charge density in the range of 1 mEq/g and 15 mEq/g, more preferably in the range of 2.5 mEq/g and 12.5 mEq/g and most preferably in the range of 5 mEq/g and 10 mEq/g and/or b) in which at least 60% of the monomer units have a cationic charge, preferably at least 70%, more preferably at least 80%, even more preferably at least 90% and most preferably equal to 100%, and/or c) having a weight average molecular weight $M_w$ of below 1,000,000 g/mole, more preferably from 50,000 to 750,000 g/mole, even more preferably from 50,000 to 650,000 g/mole and most preferably from 100,000 to 300,000 g/mole, and/or d) being a homopolymer based on monomer units selected from the group consisting of diallyldialkyl ammonium salts; tertiary and quaternized amines; quaternized imines; acrylamide methacrylamide; N,N-dimethyl acrylamide; acrylic acid; methacrylic acid; vinylsulfonic acid; vinyl pyrrolidone; hydroxyl ethyl acrylate; styrene; methyl methacrylate and vinyl acetate, preferably diallyldialkyl ammonium salts and acrylic acid and most preferably diallyldimethyl ammonium chloride and acrylic acid, e) being a copolymer based on monomer units selected from diallyldialkyl ammonium salts and methacrylic acid and comonomer units selected from the group consisting of acrylamide; methacrylamide; N,N-dimethyl acrylamide; acrylic acid; methacrylic acid; vinylsulfonic acid; vinyl pyrrolidone; hydroxyl ethyl acrylate; styrene; methyl methacrylate; vinyl acetate and mixtures thereof, preferably the monomer units are selected from diallyldialkyl ammonium salts and methacrylic acid and comonomer units selected from acrylamide and acrylic acid. It is further preferred that at least 10% of the accessible surface area of the calcium carbonate is covered by a coating comprising a cationic polymer, preferably at least 20% of the accessible surface area, more preferably at least 30%, even more preferably at least 40% and most preferably at least 50% of the accessible surface area. It is still further preferred that the phyllosilicate is bentonite, preferably bentonite comprising clay minerals selected from montmorillonites and concomitant minerals selected from the group comprising quartz, mica, kaolinite, feldspar, pyrite, calcite, cristobalite and mixtures thereof. It is also preferred that the weight ratio of the surface-treated calcium carbonatethe phyllosilicate is from 10:1 to 1:10, more preferably from 5:1 to 1:5 and even more preferably from 2:1 to 1:2.

A still further aspect of the present invention is directed to a composite material comprising at least one surface-treated calcium carbonate, at least one phyllosilicate and impurities obtainable by the process.

When in the following reference is made to preferred embodiments or technical details of the inventive process for the purification of water and/or dewatering of sludges and/or sediments, it is to be understood that these preferred embodiments or technical details also refer to the inventive use of the combination of a phyllosilicate and a surface-treated calcium carbonate for water purification and/or dewatering of sludges and/or sediments, to the inventive use of the combination of a phyllosilicate and a surface-treated calcium carbonate for reducing the amount of polymeric flocculation aids in water and/or sludges and/or sediments as well as to the composite material comprising at least one surface-treated calcium carbonate, at least one phyllosilicate and impurities defined herein and vice versa (as far as applicable). If, for example, it is set out that the surface-treated calcium carbonate provided in the inventive process preferably comprises ground calcium carbonate and/or precipitated calcium carbonate and/or surface-modified calcium carbonate, also the inventive uses as well as the inventive composite material preferably comprise ground calcium carbonate and/or precipitated calcium carbonate and/or surface-modified calcium carbonate.

According to one embodiment of the inventive process, the water and/or sludge and/or sediment of step a) is selected from industrial waste water, drinking water, urban waste water, sludge such as harbour sludge, river sludge, coastal sludge or digested sludge, waste water or process water from breweries or other beverage industries, waste water or process water in the paper industry, colour-, paints-, or coatings industry, agricultural waste water, slaughterhouse waste water, leather industry waste water and leather tanning industry.

According to another embodiment of the inventive process, the at least one surface-treated calcium carbonate of step b) comprises ground calcium carbonate and/or precipitated calcium carbonate and/or surface-modified calcium carbonate, preferably surface-modified calcium carbonate or ground calcium carbonate.

According to yet another embodiment of the inventive process, the source of ground calcium carbonate (GCC) is selected from marble, chalk, calcite, dolomite, limestone and mixtures thereof and/or the precipitated calcium carbonate (PCC) is selected from one or more of the aragonitic, vateritic and calcitic mineralogical crystal forms.

According to one embodiment of the inventive process, the coating of the at least one surface-treated calcium carbonate comprises at least one cationic polymer a) having a positive charge density in the range of 1 mEq/g and 15 mEq/g, more preferably in the range of 2.5 mEq/g and 12.5 mEq/g and most preferably in the range of 5 mEq/g and 10 mEq/g, and/or b) in which at least 60% of the monomer units have a cationic charge, preferably at least 70%, more preferably at least 80%, even more preferably at least 90% and most preferably equal to 100%, and/or c) having a weight average molecular weight $M_w$ of below 1,000,000 g/mole, more preferably from 50,000 to 750,000 g/mole, even more preferably from 50,000 to 650,000 g/mole and most preferably from 100,000 to 300,000 g/mole, and/or d) being a homopolymer based on monomer units selected from the group consisting of diallyldialkyl ammonium salts; tertiary and quaternized amines; quaternized imines; acrylamide; methacrylamide; N,N-dimethyl acrylamide; acrylic acid; methacrylic acid; vinylsulfonic acid; vinyl pyrrolidone; hydroxyl ethyl acrylate; styrene; methyl methacrylate and vinyl acetate, preferably diallyldialkyl ammonium salts and acrylic acid and most preferably diallyldimethyl ammonium chloride and acrylic acid, or e) being a copolymer based on monomer units selected from diallyldialkyl ammonium salts and methacrylic acid and comonomer units selected from the group consisting of acrylamide; methacrylamide; N,N-dimethyl acrylamide; acrylic acid; methacrylic acid; vinylsulfonic acid; vinyl pyrrolidone; hydroxyl ethyl acrylate; styrene; methyl methacrylate; vinyl acetate and mixtures thereof, preferably the monomer units are selected from diallyldialkyl ammonium salts and methacrylic acid and comonomer units selected from acrylamide and acrylic acid.

According to another embodiment of the inventive process, at least 10% of the accessible surface area of the calcium carbonate is covered by a coating comprising a cationic polymer, preferably at least 20% of the accessible surface area, more preferably at least 30%, even more preferably at least 40% and most preferably at least 50% of the accessible surface area.

According to yet another embodiment of the inventive process, the at least one phyllosilicate is bentonite, preferably bentonite comprising clay minerals selected from montmorillonites and concomitant minerals selected from the group comprising quartz, mica, kaolinite, feldspar, pyrite, calcite, cristobalite and mixtures thereof.

According to one embodiment of the inventive process, contacting step d) is carried out by adding the at least one phyllosilicate of step c) to the water and/or sludge and/or sediment of step a) before and/or during and/or after adding the at least one surface-treated calcium carbonate of step b) to the water and/or sludge and/or sediment of step a).

According to another embodiment of the inventive process, contacting step d) is carried out by adding a mixture comprising the at least one surface-treated calcium carbonate of step b) and the at least one phyllosilicate of step c) to the water and/or sludge and/or sediment of step a).

According to yet another embodiment of the inventive process, contacting step d) is carried out by adding the at least one surface-treated calcium carbonate of step b) and the at least one phyllosilicate of step c) to the water and/or sludge and/or sediment of step a) in a weight ratio of the at least one surface-treated calcium carbonatethe at least one phyllosilicate from 10:1 to 1:10, more preferably from 5:1 to 1:5 and even more preferably from 2:1 to 1:2.

According to one embodiment of the inventive process, contacting step d) is carried out by at least partially covering the surface of the water and/or sludge and/or sediment to be treated of step a) with the at least one surface-treated calcium carbonate of step b) and the at least one phyllosilicate of step c) and/or mixing the water and/or sludge and/or sediment to be treated of step a) with the at least one surface-treated calcium carbonate of step b) and the at least one phyllosilicate of step c).

As set out above, the inventive process for the purification of water and/or dewatering of sludges and/or sediments comprises the steps a), b), c) and d). In the following, it is referred to further details of the present invention and especially the foregoing steps of the inventive process for the purification of water providing improved filter cake and water quality in that the amount of polymeric flocculation aids is reduced.

Step a): Provision of Water and/or Sludge and/or Sediment to be Purified

According to step a) of the process of the present invention, water to be purified and/or sludge and/or sediment to be dewatered is provided, wherein the water and/or sludge and/or sediment comprises impurities.

The water and/or sludge and/or sediment treated by the process of the present invention is preferably selected from industrial waste water, drinking water, urban waste water, sludge such as harbour sludge, river sludge or digested sludge, waste water or process water from breweries or other beverage industries, waste water or process water in the paper industry, colour-, paints-, or coatings industry, agricultural waste water, slaughterhouse waste water, leather industry waste water and leather tanning industry.

Within the context of the present invention, the term "process water" refers to any water which is necessary to run or maintain an industrial process. The term "waste water" refers to any water drained from its place of use, e.g. an industrial plant.

The term "sludge" in the meaning of the present invention refers to any kind of sludge, e.g. primary sludge, biological sludge, mixed sludge, digested sludge, physico-chemical sludge and mineral sludge. In this regard, primary sludge comes from the settling process and usually comprises large and/or dense particles. Biological sludge comes from the biological treatment of wastewater and is usually made of a mixture of microorganisms. These microorganisms, mainly bacteria, amalgamate in bacterial flocs through the synthesis of exo-polymers. Mixed sludge is a blend of primary and biological sludges and usually comprises 35 wt.-% to 45 wt.-% of primary sludge and 65 wt.-% to 55 wt.-% of biological sludge. Digested sludge comes from a biological stabilizing step in the process called digestion and is usually performed on biological or mixed sludge. It can be done under different temperatures (mesophilic or thermophilic) and with or without the presence of oxygen (aerobic or anaerobic). Physico-chemical sludge is the result of a physico-chemical treatment of the wastewater and is composed of flocs produced by the chemical treatment. Mineral sludge is given to sludge produced during mineral processes such as quarries or mining beneficiation processes and essentially comprises mineral particles of various sizes).

Within the context of the present invention, the term "sediment" refers to any water containing particles of naturally occurring material.

Preferably, the water and/or sludge and/or sediment to be treated comprises organic impurities and/or inorganic impurities.

In accordance with the process of the present invention, the water and/or sludge and/or sediment to be treated comprise inorganic impurities. The term "inorganic impurities" in the meaning of the present invention refers to naturally occurring compounds, wherein their concentration in the water and/or sludge and/or sediment is above the natural concentration typically observed in water and/or compounds that are not naturally occurring.

In particular, many inorganic impurities are typically present as dissolved inorganics, i.e. inorganic substances in solution, such as bicarbonates of calcium and/or magnesium, which give rise to temporary hardness, while the sulfates and chlorides cause permanent hardness. Other inorganic impurities present in water and/or sludge and/or sediment include carbon dioxide, which dissolves in water to give weakly acidic carbonic acid, sodium salts, silicates leached from sandy river beds, chlorides from saline intrusion, aluminium from dosing chemicals and minerals, phosphates from fertilizers, fluoride compounds derived from additives promoting strong teeth and as discharge from fertilizer and aluminum factories, nitrate and nitrite compounds derived as runoff from fertilizer use as well as leaking from septic tanks, sewage or chlorine derived from the chlorination of the municipal system to combat water-borne diseases and cyanide compounds derived as discharge from steel and metal factories as well as plastic and fertilizer factories.

If the water and/or sludge and/or sediments to be treated comprises heavy metal impurities, they are typically ferrous and ferric iron compounds derived from minerals and rusty iron pipes; antimony compounds derived as discharge from petroleum refineries, fire retardants or electronics; arsenic compounds derived from erosion of natural deposits, runoff from orchards, runoff from glass and electronics production wastes; barium compounds as discharge of drilling wastes and from metal refineries; beryllium compounds derived as discharge from metal refineries and coal-burning factories as well as electrical, aerospace, and defense industries; cadmium compounds derived from corrosion processes of galvanized pipes, discharge from metal refineries and runoff from waste batteries and paints; chromium compounds derived from discharge from steel and pulp mills; cobalt and nickel compounds derived as discharge from metal refineries and runoff from waste batteries; copper and lead compounds derived from corrosion processes of household plumbing systems; selenium compounds derived as discharge from petroleum refineries and mines such as mines for metal or metal ore extraction or any other mines producing polluted sludge; thallium compounds derived as leaching from ore-processing sites as well as discharge from electronics, glass, and drug factories or zinc, or mercury compounds derived from mining, smelting metals (like zinc, lead and cadmium) and steel production, as well as burning coal and certain wastes can release zinc into the environment.

Furthermore, the water and/or sludge and/or sediment to be treated may also comprise organic impurities. In the context of the present invention, the term "organic impurities" has to be interpreted broadly and encompasses specific organic compounds such as surfactants, polycyclic compounds, cholesterol, or endocrine disrupting compounds as well as more complex organic materials (e.g. organic material from microorganisms).

Impurities within the meaning of the present invention shall encompass organic, inorganic, biological, mineral impurities or combinations thereof, wherein said impurities can be present in dissolved, dispersed, or emulsified forms as well as in colloidal form or adsorbed to solids, as well as in combination thereof, or still other forms.

Preferably, the water and/or sludge and/or sediment to be purified includes at least one of the following organic impurities which are selected from the group consisting of surfactants; cholesterol; endocrine disrupting compounds; amino acids; proteins; carbohydrates; defoamers; sizing agents selected from the group consisting of alkyl ketene dimer (AKD), alkenyl succinic anhydride (ASA), or mixtures thereof; polyvinylacetates; polyacrylates, in particular polyacrylate latex; styrene butadiene copolymers, in particular styrene butadiene latex; microorganisms; mineral oils; vegetable oils and fats; or any mixture thereof.

In another embodiment of the process of the present invention, the organic impurities also comprise pitch. The term "pitch" as used in the present invention refers to a specific type of organic material generated in the papermaking or pulping process. The primary fibre source in papermaking is wood, which is reduced to its constituent fibres during pulping by combinations of grinding, thermal and chemical treatment. During this process the natural resin contained within the wood is released into the process water in the form of microscopic droplets. These droplets are referred to as pitch. The chemical composition of pitch is generally divided into four classes of lipophilic components fats and fatty acids; steryl esters and sterols; terpenoids; and waxes. The chemical composition depends on the fibre source, such as variety of tree, and on the seasonal growth from which the sample is produced.

If the organic component is a surfactant, the surfactant can be ionic or non-ionic. If the surfactant is anionic, it can have a functional group selected from carboxylate, sulfate, or sulfonate. If the surfactant is cationic, its functional group can be a quaternary ammonium group.

If the water and/or sludge and/or sediment to be treated comprises endocrine disrupting compounds, they are preferably selected from the group comprising, e.g. endogenous hormones such as 17β-estradiol (E2), estrone (E1), estriol (E3), testosterone or dihydro testosterone; phyto and myco hormones such as β-sitosterol, genistein, daidzein or zeraleon; drugs such as 17β-ethinylestradiol (EE2), mestranol (ME), diethylstilbestrol (DES), and industrial chemicals such as 4-nonyl phenol (NP), 4-tert-octyl phenol (OP), bisphenol A (BPA), tributyltin (TBT), methylmercury, phthalates, PAK or PCB.

If the water and/or sludge and/or sediment to be treated comprises defoamer, it can be ethylene oxide glycol ether, a silicone oil based defoamer, a fatty acid ester defoamer, or any mixture thereof. The defoamer may be preferably selected from stickies. Stickies are potentially deposit-forming components originating from recycled paper. In general, examples are glues, hot-melt plastics, printing inks, and latex. The papermaking industry utilizes various amounts of recycled fiber or papers as a source of paper fiber furnish in the production of finished paper products. The recycled papers are often contaminated with the synthetic polymeric materials outlined above and these polymeric materials are referred to as stickies in the papermaking art. Stickies are different from pitch which is a naturally occurring resinous material from the extractive fraction of wood. Reference is made to E. L. Back and L. H. Allen, "Pitch Control, Wood Resin and Deresination", Tappi Press, Atlanta, 2000, wherein stickies are described in further detail.

If the water and/or sludge and/or sediment to be treated comprises microorganisms, they are preferably selected from bacteria, fungi, archaea or protists.

Preferred vegetable oils are edible oils such as coconut oil, corn oil, cottonseed oil, canola oil, palm oil, soybean oil, sunflower oil, or linseed oil.

The exact composition of the water and/or sludge and/or sediment to be purified and especially the amount of inorganic and/or organic impurities varies depending on the origin of the polluted water and/or sludge and/or sediment.

Step b): Provision of at Least One Surface-Treated Calcium Carbonate

According to step b) of the process of the present invention, at least one surface-treated calcium carbonate is provided.

In accordance with the inventive process, at least 1% of the accessible surface area of the calcium carbonate is covered by a coating comprising at least one cationic polymer.

The expression "at least one" surface-treated calcium carbonate means that one or more kinds of surface-treated calcium carbonates may be provided in the instant process.

According to one embodiment of the present invention, only one kind of surface-treated calcium carbonate is provided in the instant process. According to another embodiment of the present invention, a mixture of at least two kinds of surface-treated calcium carbonates is provided in the instant process.

In one embodiment of the present invention, the at least one surface-treated calcium carbonate is one kind of surface-treated calcium carbonate.

In one embodiment of the present invention, the surface-treated calcium carbonate comprises ground (or natural) calcium carbonate (GCC) or precipitated (or synthetic) calcium carbonate (PCC) or surface-modified calcium carbonate (MCC). In another preferred embodiment, the surface-treated calcium carbonate comprises a mixture of at least two calcium carbonates selected from GCC, PCC and MCC. For example, the surface-treated calcium carbonate comprises a mixture of GCC and PCC. Alternatively, the surface-treated calcium carbonate comprises a mixture of GCC and MCC. Alternatively, the surface-treated calcium carbonate comprises a mixture of PCC and MCC. In one embodiment of the present invention, the surface-treated calcium carbonate comprises surface-modified calcium carbonate (MCC) or ground calcium carbonate (GCC).

For example, the surface-treated calcium carbonate comprises surface-modified calcium carbonate (MCC). Alternatively, the surface-treated calcium carbonate comprises ground calcium carbonate (GCC).

Ground (or natural) calcium carbonate (GCC) is understood to be a naturally occurring form of calcium carbonate, mined from sedimentary rocks such as limestone or chalk, or from metamorphic marble rocks. Calcium carbonate is known to exist as three types of crystal polymorphs calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Ground calcium carbonate is almost exclusively of the calcitic polymorph, which is said to be trigonal-rhombohedral and represents the most stable of the calcium carbonate polymorphs.

Preferably, the source of the ground calcium carbonate is selected from the group comprising marble, chalk, calcite, dolomite, limestone and mixtures thereof. In one embodiment of the present invention, the source of the ground calcium carbonate is calcite. Alternatively, the source of the ground calcium carbonate is limestone.

The term "source" of the calcium carbonate in the meaning of the present invention refers to the naturally occurring mineral material from which the calcium carbonate is obtained. The source of the calcium carbonate may comprise further naturally occurring components such as magnesium carbonate, alumino silicate etc.

Additionally or alternatively, the surface-treated calcium carbonate comprises a precipitated calcium carbonate (PCC). Calcium carbonate polymorphs of the PCC type often include, in addition to calcites, less stable polymorphs of the aragonitic-type, which has an orthorhombic, acicular crystal shape, and hexagonal vateritic-type, which has an even lower stability than aragonite. The different PCC forms may be identified according to their characteristic x-ray powder diffraction (XRD) peaks. PCC synthesis most commonly occurs by a synthetic precipitation reaction that includes a step of contacting carbon dioxide with a solution of calcium hydroxide, the latter being most often provided on forming an aqueous suspension of calcium oxide, also known as burnt lime, and the suspension of which is commonly known as milk of lime. Depending on the reaction conditions, this PCC can appear in various forms, including both stable and unstable polymorphs. Indeed, PCC often represents a thermodynamically unstable calcium carbonate material. When referred to in the context of the present invention, PCC shall be understood to mean synthetic calcium carbonate products obtained notably by carbonation of a slurry of calcium hydroxide, commonly referred to in the art as a slurry of lime or milk of lime when derived from finely divided calcium oxide particles in water.

Preferred precipitated calcium carbonate is selected from aragonitic, vateritic or calcitic mineralogical crystal forms or mixtures thereof.

Additionally or alternatively, said GCC or PCC may be surface reacted to form a surface-modified calcium carbonate, which is a material comprising GCC and/or PCC and an insoluble, at least partially crystalline, non-carbonate calcium salt extending from the surface of at least part of the calcium carbonate. Such surface-modified products may, for example, be prepared according to WO 00/39222, WO 2004/083316, WO 2005/121257, WO 2009/074492, EP 2 264 108 A1, EP 2 264 109 A1.

For example, the surface-modified calcium carbonate is obtained by reacting a natural calcium carbonate and/or precipitated calcium carbonate with an acid and with carbon dioxide prior to the preparation of the surface-treated calcium carbonate, wherein the carbon dioxide is formed in situ by the acid treatment and/or is supplied from an external source. The acid treatment can be carried out with an acid having a $pK_a$ at 25° C. of 6 or less. If the $pK_a$ at 25° C. is 0 or less, the acid is preferably selected from sulphuric acid, hydrochloric acid, or mixtures thereof. If the $pK_a$ at 25° C. is from 0 to 2.5, the acid is preferably selected from $H_2SO_3$, $M^+HSO_4^-$ ($M^+$ is an alkali metal ion selected from the group comprising sodium and potassium), $H_3PO_4$, oxalic acid or mixtures thereof. If the $pK_a$ at 25° C. is from 2.5 to 6, the acid is preferably selected from acetic acid, formic acid, propanoic acid and mixtures thereof. Furthermore, the subject-matters of EP 2 264 108 A1 and EP2 264 109 A1 relating to the acid treatment and the acid used for the acid treatment are hereby incorporated by reference in its entirety.

In one embodiment of the present invention, the calcium carbonate particles of the present surface-treated calcium carbonate have a weight median particle diameter $d_{50}$ value of from 0.01 µm to 250 µm before surface treatment, preferably from 0.06 µm to 225 µm, more preferably from 1 µm to 200 µm, even more preferably from 1 µm to 150 µm and most preferably from 1 µm to 100 µm, measured according to the sedimentation process. Calcium carbonate particles having a $d_{98}$ of less than 100 microns, preferably of less than 85 microns may also be advantageous. Alternatively, calcium carbonate particles having a $d_{98}$ of less than 50 microns, preferably of less than 25 microns may be advantageous.

If the present surface-treated calcium carbonate comprises ground calcium carbonate, the calcium carbonate particles of the surface-treated calcium carbonate preferably have a weight median particle diameter $d_{50}$ value of from 0.04 µm to 250 µm before surface treatment, more preferably from 0.06 µm to 225 µm, even more preferably from 1 µm to 200 µm, still more preferably from 1 µm to 150 µm and most preferably from 1 µm to 100 µm, measured according to the sedimentation process.

If the present surface-treated calcium carbonate comprises precipitated calcium carbonate, the calcium carbonate particles of the surface-treated calcium carbonate preferably have a weight median particle diameter $d_{50}$ value of from 0.01 µm to 10 µm before surface treatment, more preferably from 0.02 µm to 5 µm, even more preferably from 0.02 µm to 2.5 µm and most preferably from 0.02 µm to 1 µm, measured according to the sedimentation process.

If the present surface-treated calcium carbonate comprises surface-modified calcium carbonate, the calcium carbonate particles of the surface-treated calcium carbonate preferably have a weight median particle diameter $d_{50}$ value of from 0.5 µm to 150 µm before surface treatment, preferably from 0.5 µm to 100 µm, more preferably from 0.5 µm to 100 µm and most preferably from 1 µm to 50 µm, measured according to the sedimentation process.

As used herein and as generally defined in the art, the weight median particle diameter "$d_{98}$" value is defined as the size at which 98% (the mean point) of the particle volume or mass is accounted for by particles having a diameter equal to the specified value. The weight median particle diameter was measured according to the sedimentation process. The sedimentation process is an analysis of sedimentation behaviour in a gravimetric field. The measurement is made with a Sedigraph™ 5100 of Micromeritics Instrument Corporation.

The calcium carbonate particles of the present surface-treated calcium carbonate preferably have a specific surface area of from 1 $m^2/g$ to 250 $m^2/g$ before surface treatment, more preferably 10 $m^2/g$ to 200 $m^2/g$, even more preferably 20 $m^2/g$ to 150 $m^2/g$ and most preferably 30 $m^2/g$ to 100 $m^2/g$, measured using nitrogen and the BET process. For example, the calcium carbonate particles of the surface-treated calcium carbonate have a specific surface area of from 40 $m^2/g$ to 50 $m^2/g$ before surface treatment, e.g. a specific surface area of 45 $m^2/g$. Alternatively, the calcium carbonate particles of the surface-treated calcium carbonate have a specific surface area of from 50 $m^2/g$ to 60 $m^2/g$, e.g. a specific surface area of 56 $m^2/g$.

If the present surface-treated calcium carbonate comprises ground calcium carbonate, the calcium carbonate particles of the surface-treated calcium carbonate preferably have a specific surface area of from 1 $m^2/g$ to 100 $m^2/g$ before surface treatment, more preferably 1 $m^2/g$ to 75 $m^2/g$, even more preferably 1 $m^2/g$ to 50 $m^2/g$ and most preferably 1 $m^2/g$ to 20 $m^2/g$, measured using nitrogen and the BET process.

If the present surface-treated calcium carbonate comprises precipitated calcium carbonate, the calcium carbonate particles of the surface-treated calcium carbonate preferably have a specific surface area of from 1 $m^2/g$ to 150 $m^2/g$ before surface treatment, more preferably 1 $m^2/g$ to 100 $m^2/g$, even more preferably 1 $m^2/g$ to 70 $m^2/g$ and most preferably 1 $m^2/g$ to 50 $m^2/g$, measured using nitrogen and the BET process.

If the present surface-treated calcium carbonate comprises surface-modified calcium carbonate, the calcium carbonate particles of the surface-treated calcium carbonate preferably have a specific surface area of from 1 $m^2/g$ to 250 $m^2/g$ before surface treatment, more preferably 1 $m^2/g$ to 200 $m^2/g$, even more preferably 10 $m^2/g$ to 200 $m^2/g$ and most preferably 15 $m^2/g$ to 170 $m^2/g$, measured using nitrogen and the BET process.

In one embodiment of the present invention, the calcium carbonate particles of the present surface-treated calcium carbonate have a specific surface area within the range of 1 $m^2/g$ to 250 $m^2/g$ and a weight median particle diameter $d_{50}$ value within the range of 0.01 µm to 250 µm before surface treatment. Preferably, the specific surface area is within the range of 10 $m^2/g$ to 200 $m^2/g$ and the weight median particle diameter $d_{50}$ value is within the range of 0.06 µm to 225 µm before surface treatment. More preferably, the specific surface area is within the range of 20 $m^2/g$ to 150 $m^2/g$ and the weight median particle diameter is within the range of 1 µm to 200 µm before surface treatment. Even more preferably, the specific surface area is within the range of 30 $m^2/g$ to 100 $m^2/g$ and the weight median particle diameter $d_{50}$ value is within the range of 1 µm to 150 µm before surface treatment. Most preferably, the specific surface area is within the range of 30 $m^2/g$ to 100 $m^2/g$ and the weight median particle diameter $d_{50}$ value is within the range of 1 µm to 100 µm before surface treatment. For example, the calcium carbonate particles of the present surface-treated calcium carbonate have a specific surface area within the range of 40 $m^2/g$ to 50 $m^2/g$ and a weight median particle diameter $d_{50}$ value within the range of 1 µm to 50 µm. Alternatively, the calcium carbonate particles of the present surface-treated calcium carbonate have a specific surface area within the range of 50 $m^2/g$ to 60 $m^2/g$ and a weight median particle diameter $d_{50}$ value within the range of 1 µm to 50 µm.

In accordance with the inventive process, at least 1% of the accessible surface area of the calcium carbonate is covered by a coating comprising at least one cationic polymer.

In this regard, the at least one cationic polymer being comprised in the coating of the surface-treated calcium carbonate may be selected from any cationic polymer having a positive charge density in the range of 1 mEq/g and 15 mEq/g. Preferably, the at least one cationic polymer is selected such that it has a positive charge density in the range of 2.5 mEq/g and 12.5 mEq/g and most preferably in the range of 5 mEq/g and 10 mEq/g.

For example, the at least one cationic polymer has a positive charge density in the range of 6 mEq/g and 8 mEq/g and most preferably in the range from 6 mEq/g and 7 mEq/g. Alternatively, the at least one cationic polymer has a positive charge density in the range of 7 mEq/g and 8 mEq/g.

Additionally or alternatively, the at least one cationic polymer being comprised in the coating of the surface-treated calcium carbonate is selected such that at least 60% of the monomer units carry a cationic charge. Preferably, the coating of the at least one surface-treated calcium carbonate comprises at least one cationic polymer in which at least 70% of the monomer units have a cationic charge, more preferably at least 80% and even more preferably at least 90%. In one preferred embodiment of the present invention, the coating of the at least one surface-treated calcium carbonate comprises at least one cationic polymer in which equal to 100%, preferably 100%, of the monomer units have a cationic charge.

In one embodiment of the present invention, the coating of the at least one surface-treated calcium carbonate comprises at least one cationic polymer having a weight average molecular weight $M_w$ of below 1,000,000 g/mole, more preferably from 50,000 to 750,000 g/mole, even more preferably from 50,000 to 650,000 g/mole and most preferably from 100,000 to 300,000 g/mole.

In the process of the present invention, the surface-treated calcium carbonate is covered by a coating comprising a homopolymer and/or a copolymer of the at least one cationic polymer. For example, the surface-treated calcium carbonate is covered by a coating comprising a homopolymer or a copolymer of the at least one cationic polymer.

In one embodiment of the present invention, the coating of the at least one surface-treated calcium carbonate comprises a homopolymer of the at least one cationic polymer. That is to say, the cationic polymer consists substantially, i.e. of equal or below than 99.5 wt.-%, of the respective monomer units.

In one embodiment of the present invention, only monomer units selected from the group consisting of diallyldialkyl ammonium salts, tertiary amines, quaternized amines, quaternized imines, acrylamide, methacrylamide, N,N-dimethyl acrylamide, acrylic acid, methacrylic acid, vinylsulfonic acid, vinyl pyrrolidone, hydroxyl ethyl acrylate, styrene, methyl methacrylate and vinyl acetate are detectable in the homopolymer.

In one embodiment of the present invention, the coating of the at least one surface-treated calcium carbonate comprises a homopolymer based on diallyldialkyl ammonium salt monomers. For example, the diallyldialkyl ammonium salt monomers are diallyldimethyl ammonium chloride.

In another embodiment of the present invention, the coating of the at least one surface-treated calcium carbonate comprises a homopolymer based on acrylic acid monomers.

In case the cationic polymer is a copolymer, it is appreciated that the copolymer comprises monomers copolymerizable with suitable comonomers. Preferably, the cationic polymer being a copolymer according to this invention comprises, preferably consists of, monomer units selected from diallyldialkyl ammonium salts and methacrylic acid and comonomer units selected from the group consisting of acrylamide, methacrylamide, N,N-dimethyl acrylamide, acrylic acid, methacrylic acid, vinylsulfonic acid, vinyl pyrrolidone, hydroxyl ethyl acrylate, styrene, methyl methacrylate, vinyl acetate and mixtures thereof. In one embodiment of the present invention, the cationic polymer is a copolymer comprising, preferably consisting of, monomer units selected from diallyldialkyl ammonium salts and methacrylic acid and comonomer units selected from the group consisting of acrylamide and acrylic acid.

For example, the coating of the surface-treated calcium carbonate may comprise a cationic polymer as described as comb polymer in US 2009/0270543 A1. The subject-matter of US 2009/0270543 A1 relating to the polymer is hereby incorporated by reference in its entirety.

In one embodiment of the present invention, the cationic polymer is a copolymer prepared from 92 wt.-% methoxy polyethylene glycol methacrylate of molecular weight 2,000 g/mole and 8 wt.-% acrylic acid and at least partially neutralised by soda. In a further preferred embodiment, the cationic polymer is a copolymer prepared from 92 wt.-% methoxy polyethylene glycol methacrylate of molecular weight 2,000 g/mole and 8 wt.-% acrylic acid and totally neutralised by soda.

If the monomer and/or comonomer units of the homopolymer or copolymer are diallyldialkyl ammonium salts, they are preferably selected from the group consisting of diallyldimethyl ammonium bromide, diallyldimethyl ammonium chloride, diallyldimethyl ammonium phosphate, diallyldiethyl ammonium sulfate, diallyldiethyl ammonium bromide, diallyldiethyl ammonium chloride, diallyldiethyl ammonium phosphate, diallyldiethyl ammonium sulphate, diallyldipropyl ammonium bromide, diallyldipropyl ammonium chloride, diallyldipropyl ammonium phosphate and diallyldipropyl ammonium sulphate. In one embodiment of the present invention, the diallyldialkyl ammonium salt monomers are diallyldimethyl ammonium chloride monomers.

For example, the cationic polymer is a homopolymer based on diallyldimethyl ammonium chloride (PolyDADMAC).

If the monomer and/or comonomer units of the homopolymer or copolymer are quaternized amines, they are preferably epichlorhydrin reaction products such as polyamine epichlorhydrin.

If the monomer and/or comonomer units of the homopolymer or copolymer are quaternized imines, they are preferably polyethyleneimine.

In one embodiment of the present invention, the cationic polymer of this invention is a copolymer comprising monomer units selected from diallyldialkyl ammonium salts and methacrylic acid, and acrylamide or acrylic acid as comonomer units.

For example, the coating of the at least one surface-treated calcium carbonate comprises a copolymer of the at least one cationic polymer, wherein the monomer and comonomer units are derivable from diallyldialkyl ammonium salts and acrylamide only. In one embodiment of the present invention, the cationic polymer being a copolymer of this invention comprises monomer and comonomer units derivable from diallyldimethyl ammonium chloride and acrylamide only. Alternatively, the coating of the at least one surface-treated calcium carbonate comprises a copolymer of the at least one cationic polymer, wherein the monomer and comonomer units are derivable from methacrylic acid and acrylic acid only.

Additionally or alternatively, the coating of the at least one surface-treated calcium carbonate comprises a copolymer of the at least one cationic polymer, wherein the monomer and comonomer units are derivable from acrylic acid and acrylamide only.

Additionally, it is appreciated that the copolymer has preferably a comonomer content of more than 2.0 wt.-%, more preferably more than 5 wt.-%, yet more preferably more than 7.5 wt.-%. For example, the copolymer has preferably a comonomer content in the range between 2 wt.-% and 80 wt.-%, more preferably in the range between 5 wt.-% and 60 wt.-% and most preferably in the range between 7.5 wt.-% and 40 wt.-%. The weight percentage is based on the total weight of the copolymer.

In one embodiment of the present invention, the coating of the at least one surface-treated calcium carbonate comprises a copolymer, wherein the molar ratio of monomer units and comonomer units is from 5:1 to 1:5, more preferably from 4:1 to 1:4, even more preferably from 3:1 to 1:3 and most preferably from 3:1 to 1:1.

In one embodiment of the present invention, the cationic polymer comprises a mixture of at least two cationic polymers. Preferably, if the cationic polymer comprises a mixture of at least two cationic polymers, one cationic polymer is a homopolymer based on diallyldimethyl ammonium chloride. Alternatively, if the cationic polymer comprises a mixture of at least two cationic polymers, one cationic polymer is a homopolymer based on acrylic acid.

In one embodiment of the present invention, the cationic polymer comprises a mixture of two cationic polymers, wherein one cationic polymer is a homopolymer based on diallyldimethyl ammonium chloride and the other one is selected from the group consisting of a homopolymer based on acrylic acid, a copolymer based on diallyldimethyl ammonium chloride and acrylamide and a copolymer based on methacrylic acid and acrylic acid. Alternatively, if the cationic polymer comprises a mixture of two cationic polymers, wherein one cationic polymer is a homopolymer based on acrylic acid, the other one is selected from the group consisting of a homopolymer based on diallyldimethyl ammonium chloride, a copolymer based on diallyldimethyl ammonium chloride and acrylamide and a copolymer based on methacrylic acid and acrylic acid.

If the cationic polymer comprises a mixture of two cationic polymers, the molar ratio of the homopolymer based on diallyldimethyl ammonium chloride and the second cationic polymer is from 99:1 to 1:99, more preferably from 50:1 to 1:50, even more preferably from 25:1 to 1:25 and most preferably from 10:1 to 1:10. In one especially preferred embodiment of the present invention, the molar ratio of the homopolymer based on diallyldimethyl ammonium chloride and the second cationic polymer is from 901 to 11, more preferably from 90:1 to 10:1 and most preferably from 90:1 to 50:1.

In one embodiment of the present invention, the molar ratio of the homopolymer based on acrylic acid and the second cationic polymer is from 99:1 to 1:99, more preferably from 50:1 to 1:50, even more preferably from 25:1 to 1:25 and most preferably from 10:1 to 1:10. For example, the mole ratio of the homopolymer based on acrylic acid and the second cationic polymer is from 90:1 to 1:1, more preferably from 90:1 to 10:1 and most preferably from 90:1 to 50:1.

The at least one cationic polymer is preferably present in the coating covering the calcium carbonate in a quantity such that the total weight of said at least one cationic polymer on the surface of the surface-treated calcium carbonate product is between 0.01% w/w and 80% w/w of the calcium carbonate.

In one embodiment of the present invention, the at least one cationic polymer is present in the coating covering the calcium carbonate in a quantity such that the total weight of said at least one cationic polymer on the surface of the surface-treated calcium carbonate product is less than 80% w/w, more preferably less than 60% w/w and most preferably less than 50% w/w of the calcium carbonate.

In another embodiment of the present invention, the at least one cationic polymer is present in the coating covering at least 1% of the accessible surface area of the calcium carbonate in an amount of about 0.1 wt.-% to 30 wt.-%, more preferably of about 0.1 wt.-% to 20 wt.-%, even more preferably of about 0.2 wt.-% to 15 wt.-% and most preferably of about 0.2 wt.-% to 10 wt.-%, based on the dry weight of the calcium carbonate.

Alternatively, at least 10% of the accessible surface area of the calcium carbonate particles is covered by a coating comprising the at least one cationic polymer. In one embodiment of the present invention, at least 20% of the accessible surface area of the calcium carbonate particles is covered by a coating comprising the at least one cationic polymer, preferably at least 30% of the accessible surface area, more preferably at least 40% of the accessible surface area and most preferably at least 50% of the accessible surface area. For example, at least 75% of the accessible surface area of the calcium carbonate particles is covered by a coating comprising the at least one cationic polymer. For example, at least 90% of the accessible surface area of the calcium carbonate particles is covered by a coating comprising the at least one cationic polymer.

In one embodiment of the present invention, at least 75% of the accessible surface area of the calcium carbonate particles is covered by a coating comprising a homopolymer based on diallyldimethyl ammonium chloride. In another embodiment of the present invention, at least 75% of the accessible surface area of the calcium carbonate particles is covered by a coating comprising a homopolymer based on acrylic acid.

In one embodiment of the present invention, the at least one cationic polymer has a solubility in water of above 50 g/100 ml of water, preferably of above 75 g/100 ml of water, even more preferably of above 100 g/100 ml of water and most preferably of above 150 g/100 ml of water. In one especially preferred embodiment, the at least one cationic polymer is readily soluble in water.

Preferably, the at least one surface-treated calcium carbonate used in the present process is prepared by mixing the ground calcium carbonate and/or precipitated calcium carbonate and/or surface-modified calcium carbonate, preferably in form of slurry, and the cationic polymer, preferably in form of a suspension, before being brought into contact with the water to be treated. Mixing can be accomplished by any conventional means known to the skilled person.

The at least one surface-treated calcium carbonate is preferably in the form of a particulate material, and may have a particle size distribution as conventionally employed for the material(s) involved in the treatment of polluted water. In general, the weight median particle diameter $d_{50}$ value of the surface-treated calcium carbonate is in the range between 0.01 µm and 250 µm, preferably between 0.06 µm and 225 µm, more preferably between 1 µm and 200 µm, even more preferably between 1 µm and 150 µm, and most preferably between 1 µm and 100 µm, measured according to the sedimentation process. A surface-treated calcium carbonate having a $d_{98}$ of less than 100 microns, preferably of less than 85 microns may also be advantageous. Alternatively, surface-treated calcium carbonate having a $d_{98}$ of less than 50 microns, preferably of less than 25 microns may be advantageous.

If the at least one surface-treated calcium carbonate comprises ground calcium carbonate, the surface-treated calcium carbonate preferably has a weight median particle diameter $d_{50}$ value of from 0.04 µm to 250 µm, more preferably from 0.06 µm to 225 µm, even more preferably from 1 µm to 200 µm, still more preferably from 1 µm to 150 µm and most preferably from 1 µm to 100 µm, measured according to the sedimentation process.

If the at least one surface-treated calcium carbonate comprises precipitated calcium carbonate, the surface-treated calcium carbonate preferably has a weight median particle diameter $d_{50}$ value of from 0.01 µm to 10 µm, more preferably from 0.02 µm to 5 µm, even more preferably from 0.02 µm to 2.5 µm and most preferably from 0.02 µm to 1 µm, measured according to the sedimentation process.

If the at least one surface-treated calcium carbonate comprises surface-modified calcium carbonate, the surface-treated calcium carbonate preferably has a weight median particle diameter $d_{50}$ value of from 0.5 µm to 150 µm, preferably from 0.5 µm to 100 µm, more preferably from 0.5 µm to 100 µm and most preferably from 1 µm to 50 µm, measured according to the sedimentation process. In one embodiment of the present invention, the at least one surface-treated calcium carbonate may be in the form of agglomerated particles, having a weight median particle diameter $d_{50}$ value of from 0.5 µm to 250 µm and preferably from 0.5 µm to 150 µm measured according to the sedimentation process.

The at least one surface-treated calcium carbonate preferably has a specific surface area of from 1 m²/g to 250 m²/g, preferably 20 m²/g to 200 m²/g, more preferably 30 m²/g to 150 m²/g and most preferably 30 m²/g to 100 m²/g, measured using nitrogen and the BET process. For example, the at least one surface-treated calcium carbonate has a specific surface area of from 40 m²/g to 50 m²/g, e.g. a specific surface area of 45 m²/g. Alternatively, the at least one surface-treated calcium carbonate has a specific surface area of from 50 m²/g to 60 m²/g, e.g. a specific surface area of 56 m²/g.

If the at least one surface-treated calcium carbonate comprises ground calcium carbonate, the surface-treated calcium carbonate preferably has a specific surface area of from 1 m²/g to 100 m²/g, more preferably 1 m²/g to 75 m²/g, even more preferably 1 m²/g to 50 m²/g and most preferably 1 m²/g to 20 m²/g, measured using nitrogen and the BET process.

If the at least one surface-treated calcium carbonate comprises precipitated calcium carbonate, the surface-treated calcium carbonate preferably has a specific surface area of from 1 m²/g to 150 m²/g, more preferably 1 m²/g to 100 m²/g, even more preferably 1 m²/g to 70 m²/g and most preferably 1 m²/g to 50 m²/g, measured using nitrogen and the BET process.

If the at least one surface-treated calcium carbonate comprises surface-modified calcium carbonate, the surface-treated calcium carbonate preferably has a specific surface area of from 1 m²/g to 250 m²/g before surface treatment, more preferably 1 m²/g to 200 m²/g, even more preferably 10 m²/g to 200 m²/g and most preferably 15 m²/g to 170 m²/g, measured using nitrogen and the BET process.

In one embodiment of the present invention, the at least one surface-treated calcium carbonate has a specific surface area within the range of 1 m²/g to 250 m²/g and a weight median particle diameter $d_{50}$ value within the range of 0.01 µm to 250 µm. Preferably, the specific surface area is within the range of 20 m²/g to 200 m²/g and the weight median particle diameter $d_{50}$ value is within the range of 0.06 µm to 225 µm. More preferably, the specific surface area is within the range of 30 m²/g to 150 m²/g and the weight median particle diameter is within the range of 1 µm to 200 µm. Even more preferably, the specific surface area is within the range of 30 m²/g to 100 m²/g and the weight median particle diameter $d_{50}$ value is within the range of 1 µm to 150 µm. Most preferably, the specific surface area is within the range of 30 m²/g to 100 m²/g and the weight median particle diameter $d_{50}$ value is within the range of 1 µm to 100 µm. For example, the at least one surface-treated calcium carbonate has a specific surface area within the range of 40 m²/g to 50 m²/g and a weight median particle diameter $d_{50}$ value within the range of 1 µm to 50 µm. Alternatively, the at least one surface-treated calcium carbonate has a specific surface area within the range of 50 m²/g to 60 m²/g and a weight median particle diameter $d_{50}$ value within the range of 1 µm to 50 µm.

The at least one surface-treated calcium carbonate to be used in the inventive process can be present in any appropriate form, e.g. in the form of granules and/or a powder or in the form of a cake. Preferably, the surface-treated calcium carbonate to be used in the inventive process is in powder form and/or in the form of granules. In one embodiment of the present invention, the surface-treated calcium carbonate to be used in the inventive process is in powder form. Alternatively, the surface-treated calcium carbonate to be used in the inventive process can be present as an aqueous suspension, e.g. in the form of a slurry or a paste which can be metered with a conveying screw.

Said slurry may comprise at least one further cationic polymer, wherein said cationic polymer can be the same cationic polymer used for coating or a different cationic polymer, e.g. a further cationic polymer as described herein. After coating the slurry may be used directly without further purification, or at least one further cationic polymer may be added to the slurry.

A "slurry" or "suspension" in the meaning of the present invention comprises undissolved solids, i.e. surface-treated calcium carbonate and water and optionally further additives. Suspensions usually contain large amounts of solids and are more viscous and generally of higher density than the liquid from which they are formed. It is accepted in the art that the general term "dispersion" inter alia covers "suspensions" or "slurries" as a specific type of dispersion.

In one embodiment of the present invention, the at least one surface-treated calcium carbonate to be used in the inventive process is suspended in water such that the slurry has a content of surface-treated calcium carbonate within the range of 1 wt.-% to 80 wt.-%, more preferably 3 wt.-% to 60 wt.-%, and even more preferably 5 wt.-% to 60 wt.-%, based on the weight of the slurry.

Step c) Providing at Least One Phyllosilicate

According to step c) of the process of the present invention, at least one phyllosilicate is provided.

The expression "at least one" phyllosilicate means that one or more kinds of phyllosilicates may be provided in the instant process.

According to one embodiment of the present invention, only one kind of phyllosilicate is provided in the instant process. According to another embodiment of the present invention, a mixture of at least two kinds of phyllosilicates is provided in the instant process.

In one embodiment of the present invention, the at least one phyllosilicate is one kind of phyllosilicate.

The at least one phyllosilicate is preferably bentonite. Accordingly, the at least one phyllosilicate preferably comprises bentonite, more preferably consists of bentonite.

If the at least one phyllosilicate comprises, preferably consists of, bentonite the benontonite is preferably selected from sodium bentonite, calcium bentonite, potassium bentonite and mixtures thereof.

It is appreciated that bentonite is preferably a natural material and thus its precise composition, the number of its constituents and the amount of the single constituents may vary in a broad range usually depending on the source of origin.

For example, the bentonite usually comprises, preferably consists of, various clay minerals such as in particular montmorillonite as the main component, but also quartz, kaolinite, mica, feldspar, pyrite, calcite, cristobalite and mixtures thereof as concomitant minerals. These minerals may be present in variable amounts, as well as other components, depending on the site of origin.

In one embodiment of the present invention, the at least one phyllosilicate comprises, preferably consists of, bentonite comprising montmorillonite.

Bentonite with a montmorillonite content of at least 50.0 wt.-%, preferably of at least 60.0 wt.-%, e.g. between 60.0 and 95.0 wt.-%, based on the total weight of the bentonite, is especially suitable as the at least one phyllosilicate of step c).

Additionally or alternatively, the bentonite comprises constituents selected from the group comprising $SiO_2$, $Al_2O_3$, CaO, $Fe_2O_3$, $K_2O$, MgO, $Na_2O$, $TiO_2$ and the like.

For example, the bentonite comprises $SiO_2$ in an amount of at least 50.0 wt.-%, preferably from 50.0 to 95.0 wt.-% e.g. from 50.0 to 80.0 wt.-%, based on the total weight of the bentonite. Additionally or alternatively, the bentonite comprises $Al_2O_3$ in an amount of at least 10.0 wt.-%, preferably from 10.0 to 40.0 wt.-% e.g. from 10.0 to 30.0 wt.-%, based on the total weight of the bentonite.

Additionally or alternatively, the bentonite comprises CaO, $Fe_2O_3$, $K_2O$, MgO, $Na_2O$ and/or $TiO_2$ in an amount of below 20.0 wt.-%, preferably from 5.0 to 20.0 wt.-% e.g. from 5.0 to 15.0 wt.-%, based on the total weight of the bentonite. For example, the bentonite comprises CaO in an amount of below 10.0 wt.-%, preferably from 0.5 to 10.0 wt.-% e.g. from 0.5 to 5.0 wt.-%, based on the total weight of the bentonite. For example, the bentonite comprises $Fe_2O_3$ in an amount of below 10.0 wt.-%, preferably from 1.0 to 10.0 wt.-% e.g. from 2.5 to 7.5 wt.-%, based on the total weight of the bentonite. For example, the bentonite comprises $K_2O$ in an amount of below 10.0 wt.-%, preferably from 0.5 to 10.0 wt.-% e.g. from 0.5 to 5.0 wt.-%, based on the total weight of the bentonite. For example, the bentonite comprises MgO in an amount of below 10.0 wt.-%, preferably from 0.5 to 10.0 wt.-% e.g. from 0.5 to 5.0 wt.-%, based on the total weight of the bentonite. For example, the bentonite comprises $Na_2O$ in an amount of below 5.0 wt.-%, preferably from 0.05 to 5.0 wt.-% e.g. from 0.05 to 2.5 wt.-%, based on the total weight of the bentonite. For example, the bentonite comprises $TiO_2$ in an amount of below 5.0 wt.-%, preferably from 0.05 to 5.0 wt.-% e.g. from 0.05 to 2.5 wt.-%, based on the total weight of the bentonite.

If the at least one phyllosilicate comprises or consists of bentonite, the bentonite preferably has a weight median particle size $d_{50}$ from 0.02 to 100 µm, from 0.1 to 80 µm, or from 0.5 to 70 µm, preferably from 0.1 to 60 µm as measured by Malvern Mastersizer 2000 Ver. 5.4.

The at least one phyllosilicate to be used in the inventive process can be present in any appropriate form, e.g. in the form of granules and/or a powder or in the form of a cake. Preferably, the at least one phyllosilicate to be used in the inventive process is in powder form and/or in the form of granules. In one embodiment of the present invention, the at least one phyllosilicate to be used in the inventive process is in powder form. Alternatively, the at least one phyllosilicate to be used in the inventive process can be present as an aqueous suspension, e.g. in the form of a slurry or a paste which can be metered with a conveying screw.

A "slurry" or "suspension" in the meaning of the present invention comprises undissolved solids, i.e. the at least one phyllosilicate and water and optionally further additives. Suspensions usually contain large amounts of solids and are more viscous and generally of higher density than the liquid from which they are formed.

In one embodiment of the present invention, the at least one phyllosilicate to be used in the inventive process is suspended in water such that the slurry has a content of phyllosilicate within the range of 1 wt.-% to 80 wt.-%, more preferably 3 wt.-% to 60 wt.-%, and even more preferably 5 wt.-% to 60 wt.-%, based on the weight of the slurry.

In one embodiment of the present invention, the at least one surface-treated calcium carbonate of step b) and the at least one phyllosilicate of step c) are provided in a weight ratio of the at least one surface-treated calcium carbonate: the at least one phyllosilicate from 10:1 to 1:10. For example, the at least one surface-treated calcium carbonate of step b) and the at least one phyllosilicate of step c) are provided in a weight ratio of the at least one surface-treated calcium carbonate: the at least one phyllosilicate from 5:1 to 1:5 or from 2:1 to 1:2.

For example, the at least one surface-treated calcium carbonate of step b) and the at least one phyllosilicate of step c) are provided in a weight ratio of the at least one surface-treated calcium carbonate: the at least one phyllosilicate of about 1:1.

Step d) Contacting the Water and/or Sludge and/or Sediment with the at Least One Surface-treated Calcium Carbonate and the at Least One Phyllosilicate According to step d) of the process of the present invention, the water to be purified and/or sludge and/or sediment to be dewatered provided in step a) is contacted with the at least one surface-treated calcium carbonate of step b) and the at least one phyllosilicate of step c) for obtaining a composite material comprising the at least one surface-treated calcium carbonate, the at least one phyllosilicate and impurities.

In general, the water to be purified and/or sludge and/or sediment to be dewatered and the surface-treated calcium carbonate at least one phyllosilicate can be brought into contact by any conventional means known to the skilled person.

It is appreciated that contacting step d) is preferably carried out by adding the at least one phyllosilicate of step c) to the water and/or sludge and/or sediment of step a) before and/or during and/or after adding the at least one surface-treated calcium carbonate of step b) to the water and/or sludge and/or sediment of step a).

In one embodiment of the present invention, the step of contacting the water to be purified and/or sludge and/or sediment to be dewatered with the at least one phyllosilicate and the at least one surface-treated calcium carbonate is carried out in that the at least one phyllosilicate is added to the water and/or sludge and/or sediment before and during and after adding the at least one surface-treated calcium carbonate to the water and/or sludge and/or sediment.

In one embodiment of the present invention, contacting step d) is carried out by adding the at least one phyllosilicate of step c) to the water and/or sludge and/or sediment before and during and after adding the at least one surface-treated calcium carbonate to the water and/or sludge and/or sediment. Alternatively, contacting step d) is carried out by adding the at least one phyllosilicate of step c) to the water and/or sludge and/or sediment before and after adding the at least one surface-treated calcium carbonate to the water and/or sludge and/or sediment. Alternatively, contacting step d) is carried out by adding the at least one phyllosilicate of step c) to the water and/or sludge and/or sediment before and after adding the at least one surface-treated calcium carbonate to the water and/or sludge and/or sediment. Alternatively, contacting step d) is carried out by adding the at least one phyllosilicate of step c) to the water and/or sludge and/or sediment during and after adding the at least one surface-treated calcium carbonate to the water and/or sludge and/or sediment.

In case the at least one phyllosilicate of step c) is added to the water and/or sludge and/or sediment before and during and after or before and during or during and after or before and after adding the at least one surface-treated calcium carbonate to the water and/or sludge and/or sediment, the at least one phyllosilicate is preferably added in several portions and/or continuously over the period required for contacting the at least one surface-treated calcium carbonate with the water and/or sludge and/or sediment.

If the at least one phyllosilicate of step c) is added to the water and/or sludge and/or sediment before and during and after or before and during or during and after or before and after adding the at least one surface-treated calcium carbonate to the water and/or sludge and/or sediment, the at least one phyllosilicate of step c) is preferably added in two to five portions, more preferably in two to four portions, even more preferably in two or three portions. Preferably, if the at least one phyllosilicate of step c) is added to the water and/or sludge and/or sediment before and during and after adding the at least one surface-treated calcium carbonate to the water and/or sludge and/or sediment, the at least one phyllosilicate of step c) is preferably added in three portions, i.e. one portion before adding the at least one surface-treated calcium carbonate of step b), one portion during adding the at least one surface-treated calcium carbonate of step b) and one portion after adding the at least one surface-treated calcium carbonate of step b). Alternatively, if the at least one phyllosilicate of step c) is added to the water and/or sludge and/or sediment before and during or during and after or before and after adding the at least one surface-treated calcium carbonate to the water and/or sludge and/or sediment, the at least one phyllosilicate of step c) is preferably added in two portions. For example, if the at least one phyllosilicate of step c) is added to the water and/or sludge and/or sediment before and during adding the at least one surface-treated calcium carbonate to the water and/or sludge and/or sediment, the at least one phyllosilicate of step c) is preferably added in two portions, i.e. one portion before adding the at least one surface-treated calcium carbonate of step b) and one portion during adding the at least one surface-treated calcium carbonate of step b). For example, if the at least one phyllosilicate of step c) is added to the water and/or sludge and/or sediment during and after adding the at least one surface-treated calcium carbonate to the water and/or sludge and/or sediment, the at least one phyllosilicate of step c) is preferably added in two portions, i.e. one portion during adding the at least one surface-treated calcium carbonate of step b) and one portion after adding the at least one surface-treated calcium carbonate of step b). For example, if the at least one phyllosilicate of step c) is added to the water and/or sludge and/or sediment before and after adding the at least one surface-treated calcium carbonate to the water and/or sludge and/or sediment, the at least one phyllosilicate of step c) is preferably added in two portions, i.e. one portion before adding the at least one surface-treated calcium carbonate of step b) and one portion after adding the at least one surface-treated calcium carbonate of step b).

In the case where the at least one phyllosilicate of step c) is added in several portions, the at least one phyllosilicate of step c) is preferably added in about equal portions before and during and after or before and during or during and after or before and after adding the at least one surface-treated calcium carbonate to the water and/or sludge and/or sediment.

As an alternative, it is also possible to add the at least one phyllosilicate of step c) in unequal portions before and during and after or before and during or during and after or before and after adding the at least one surface-treated calcium carbonate to the water and/or sludge and/or sediment.

In one embodiment of the present invention, the step of contacting the water to be purified and/or sludge and/or sediment to be dewatered with the at least one phyllosilicate and the at least one surface-treated calcium carbonate is carried out in that the at least one phyllosilicate is added to the water and/or sludge and/or sediment before or during or after adding the at least one surface-treated calcium carbonate to the water and/or sludge and/or sediment.

For example, contacting step d) is carried out by adding the at least one phyllosilicate of step c) to the water and/or sludge and/or sediment before or during adding the at least one surface-treated calcium carbonate to the water and/or sludge and/or sediment. Alternatively, contacting step d) is carried out by adding the at least one phyllosilicate of step c) to the water and/or sludge and/or sediment before or after adding the at least one surface-treated calcium carbonate to the water and/or sludge and/or sediment. Alternatively, contacting step d) is carried out by adding the at least one phyllosilicate of step c) to the water and/or sludge and/or sediment during or after adding the at least one surface-treated calcium carbonate to the water and/or sludge and/or sediment.

In one embodiment of the present invention, contacting step d) is carried out by adding the at least one phyllosilicate of step c) to the water and/or sludge and/or sediment before adding the at least one surface-treated calcium carbonate to the water and/or sludge and/or sediment. Alternatively, contacting step d) is carried out by adding the at least one phyllosilicate of step c) to the water and/or sludge and/or sediment during adding the at least one surface-treated calcium carbonate to the water and/or sludge and/or sediment. Alternatively, contacting step d) is carried out by adding the at least one phyllosilicate of step c) to the water and/or sludge and/or sediment after adding the at least one surface-treated calcium carbonate to the water and/or sludge and/or sediment.

For example, contacting step d) is carried out by adding the at least one phyllosilicate of step c) to the water and/or sludge and/or sediment before adding the at least one surface-treated calcium carbonate to the water and/or sludge and/or sediment.

If the at least one phyllosilicate of step c) is added to the water and/or sludge and/or sediment before or during or after adding the at least one surface-treated calcium carbonate to the water and/or sludge and/or sediment, the at least one phyllosilicate of step c) is preferably added in one portion and/or continuously before or during or after adding the at least one surface-treated calcium carbonate to the water and/or sludge and/or sediment. In the case where the at least one phyllosilicate of step c) is added to the water and/or sludge and/or sediment before or during or after adding the at least one surface-treated calcium carbonate to the water and/or sludge and/or sediment, the at least one phyllosilicate of step c) is added to the water and/or sludge and/or sediment in one portion and/or continuously over a period of 1 h or less, preferably over a period of 45 min or less, more preferably over a period of 30 min or less and most preferably over a period of 15 min or less to provide a suitable distribution of the at least one phyllosilicate of step c) within the water and/or sludge and/or sediment of step a). In another embodiment of the present invention, the at least one phyllosilicate of step c) is added to the water and/or sludge and/or sediment in one portion and/or continuously over a period of 10 min or less, like a period of 5 min or less.

If the at least one phyllosilicate of step c) is added to the water and/or sludge and/or sediment during adding the at least one surface-treated calcium carbonate to the water and/or sludge and/or sediment, the at least one surface-treated calcium carbonate of step b) and the at least one phyllosilicate of step c) are preferably provided in form a mixture.

In this embodiment, contacting step d) of the instant process is thus preferably carried out by adding a mixture comprising the at least one surface-treated calcium carbonate of step b) and the at least one phyllosilicate of step c) to the water and/or sludge and/or sediment of step a).

If the at least one surface-treated calcium carbonate of step b) and the at least one phyllosilicate of step c) are provided in form a mixture, the mixture can be present in any appropriate form, e.g. in the form of granules and/or a powder or in the form of a cake. Preferably, the mixture comprising the at least one surface-treated calcium carbonate of step b) and the at least one phyllosilicate of step c) to be used in the inventive process is in powder form and/or in the form of granules or pellets. In one embodiment of the present invention, the mixture comprising the at least one surface-treated calcium carbonate of step b) and the at least one phyllosilicate of step c) to be used in the inventive process is in powder form. Alternatively, the mixture comprising the at least one surface-treated calcium carbonate of step b) and the at least one phyllosilicate of step c) to be used in the inventive process can be present as an aqueous suspension, e.g. in the form of a slurry or a paste which can be metered with a conveying screw.

A "slurry" or "suspension" in the meaning of the present invention comprises undissolved solids, i.e. the at least one surface-treated calcium carbonate of step b) and the at least one phyllosilicate of step c) and water and optionally further additives.

In one embodiment of the present invention, the mixture comprising the at least one surface-treated calcium carbonate of step b) and the at least one phyllosilicate of step c) to be used in the inventive process is suspended in water such that the slurry has a solids content of the at least one surface-treated calcium carbonate of step b) and the at least one phyllosilicate of step c) within the range of 1 wt.-% to 80 wt.-%, more preferably 3 wt.-% to 60 wt.-%, and even more preferably 5 wt.-% to 60 wt.-%, based on the weight of the slurry.

In one embodiment of the present invention, contacting step d) is carried out by adding the at least one surface-treated calcium carbonate of step b) and the at least one phyllosilicate of step c) to the water and/or sludge and/or sediment of step a) in a weight ratio of the at least one surface-treated calcium carbonate: the at least one phyllosilicate from 10:1 to 1:10. For example, contacting step d) is carried out by adding the at least one surface-treated calcium carbonate of step b) and the at least one phyllosilicate of step c) to the water and/or sludge and/or sediment of step a) in a weight ratio of the at least one surface-treated calcium carbonate: the at least one phyllosilicate from 5:1 to 1:5 or from 2:1 to 1:2.

For example, contacting step d) is carried out by adding the at least one surface-treated calcium carbonate of step b) and the at least one phyllosilicate of step c) to the water and/or sludge and/or sediment of step a) in a weight ratio of the at least one surface-treated calcium carbonate: the at least one phyllosilicate of about 1:1.

For example, the step of contacting the water to be purified and/or sludge and/or sediment to be dewatered with the at least one phyllosilicate of step c) and the at least one surface-treated calcium carbonate of step b), wherein at least 1% of the accessible surface area of the calcium carbonate is covered by a coating comprising at least one cationic polymer, preferably takes place in that the surface of the polluted water and/or sludge and/or sediment is at least partially covered with the at least one phyllosilicate and the at least one surface-treated calcium carbonate. Additionally or alternatively, the step of contacting the water to be purified and/or sludge and/or sediment to be dewatered with the at least one phyllosilicate of step c) and the at least one surface-treated calcium carbonate of step b) preferably takes place in that the polluted water and/or sludge and/or sediment of step a) is mixed with the surface-treated calcium carbonate of step b) and the at least one phyllosilicate of step c). The skilled man will adapt the mixing conditions (such as the configuration of mixing speed) according to his needs and available equipment.

Preferably, the at least one surface-treated calcium carbonate of step b) and the at least one phyllosilicate of step c) are suspended in the water and/or sludge and/or sediment to be treated, e.g. by agitation means.

The treatment time for carrying out the contacting of the water to be purified and/or sludge and/or sediment to be dewatered with the at least one surface-treated calcium carbonate of step b) and the at least one phyllosilicate of step c) is carried out for a period in the range of several seconds to several minutes, e.g. 20 s or more, preferably 30 s or more, more preferably 60 s or more and most preferably for a period of 120 s or more. In general, the length of contacting the water and/or sludge and/or sediment to be treated with the at least one surface-treated calcium carbonate of step b) and the at least one phyllosilicate of step c) is determined by the degree of water and/or sludge and/or sediment pollution and the specific water and/or sludge and/or sediment to be treated.

It is to be understood that the amount of the at least one surface-treated calcium carbonate of step b) and/or the at least one phyllosilicate of step c) according to the present process is selected such that it is sufficient in the water and/or sludge and/or sediment to be treated, i.e. high enough for providing efficient binding activity for at least one type of inorganic impurities present in the polluted water and/or sludge and/or sediment but at the same time is so low that no significant amount of unbound surface-treated calcium carbonate and/or phyllosilicate would be observed in the water and/or sludge and/or sediment to treated.

The amount of the at least one surface-treated calcium carbonate of step b) depends on the type of water and/or sludge and/or sediment to be treated as well as on the type and amount of impurities. Preferably, an amount of 0.1 to 10.0 wt.-%, more preferably 0.5 to 5.0 wt.-% surface-treated calcium carbonate, based on the total weight of the water and/or sludge and/or sediment to be treated, is added. Accordingly, also the amount of the at least one phyllosilicate of step c) depends on the type of water and/or sludge and/or sediment to be treated as well as on the type and amount of impurities. Preferably, an amount of 0.1 to 10.0 wt.-%, more preferably 0.5 to 5.0 wt.-% phyllosilicate, based on the total weight of the water and/or sludge and/or sediment to be treated, is added.

The at least one surface-treated calcium carbonate of step b) and/or the at least one phyllosilicate of step c) can be added as an aqueous suspension, e.g. the suspensions described above. Alternatively, the at least one surface-treated calcium carbonate of step b) and/or the at least one phyllosilicate of step c) can be added to the water to be purified and/or sludge and/or sediment to be dewatered in any appropriate solid form, e.g. in the form of granules or a powder or in form of a cake.

Within the context of the present invention, it is also possible to provide an immobile phase, e.g. in the form of a cake or layer, comprising the at least one surface-treated calcium carbonate of step b) and/or the at least one phyllosilicate of step c), the water and/or sludge and/or sediment to be treated running through said immobile phase.

In one embodiment of the present invention, the water and/or sludge and/or sediment to be purified is passed through a permeable filter comprising the at least one surface-treated calcium carbonate of step b) and/or the at least one phyllosilicate of step c) and being capable of retaining, via size exclusion, the inorganic impurities on the filter surface as the liquid is passed through by gravity and/or under vacuum and/or under pressure. This process is called "surface filtration".

In another preferred technique known as depth filtration, a filtering aid comprising a number of tortuous passages of varying diameter and configuration retains impurities by molecular and/or electrical forces adsorbing the impurities onto the at least one surface-treated calcium carbonate of step b) and/or the at least one phyllosilicate of step c) which is/are present within said passages, and/or by size exclusion, retaining the impurity particles if they are too large to pass through the entire filter layer thickness.

The techniques of depth filtration and surface filtration may additionally be combined by locating the depth filtration layer on the surface filter; this configuration presents the advantage that those particles that might otherwise block the surface filter pores are retained in the depth filtration layer.

In one embodiment of the present invention, the process further comprises step e) of contacting the water to be purified and/or sludge and/or sediment to be dewatered with at least one polymeric flocculation aid.

In one embodiment of the present invention, the polymeric flocculation aid and the at least one surface-treated calcium carbonate of step b) and/or the at least one phyllosilicate of step c) are added simultaneously to the water and/or sludge and/or sediment to be treated. In another embodiment of the present invention, the polymeric flocculation aid and the at least one surface-treated calcium carbonate of step b) and/or the at least one phyllosilicate of step c) are added separately to the water and/or sludge and/or sediment to be treated. In this case, the water and/or sludge and/or sediment to be treated is first contacted with the at least one surface-treated calcium carbonate of step b) and/or the at least one phyllosilicate of step c) and then with the polymeric flocculation aid.

For example, the polymeric flocculation aid is added to the water and/or sludge and/or sediment to be treated when adsorption of impurities on the at least one surface-treated calcium carbonate of step b) and/or the at least one phyllosilicate of step c) has reached its maximum, i.e. there is no further decrease of inorganic impurities within the water. However, it is also possible to add the polymeric flocculation aid at an earlier stage, e.g. when at least 50%, at least 70% or at least 90% of maximum adsorption of impurities on the at least one surface-treated calcium carbonate of step b) and/or the at least one phyllosilicate of step c) has been reached.

The step of contacting the water to be purified and/or sludge and/or sediment to be dewatered with the at least one surface-treated calcium carbonate of step b) and/or the at least one phyllosilicate of step c) and the polymeric flocculation aid preferably takes place in that the surface of the water and/or sludge and/or sediment is at least partially covered, either simultaneously or separately, with the at least one at least one surface-treated calcium carbonate of step b) and/or the at least one phyllosilicate of step c) and the polymeric flocculation aid. Additionally or alternatively, the step of contacting the water to be purified and/or sludge and/or sediment to be dewatered with the at least one surface-treated calcium carbonate of step b) and/or the at least one phyllosilicate of step c) and the polymeric flocculation aid preferably takes place in that the water and/or sludge and/or sediment is, either simultaneously or separately, mixed with the at least one surface-treated calcium carbonate of step b) and/or the at least one phyllosilicate of step c) and the polymeric flocculation aid. The skilled man will adapt the mixing conditions (such as the configuration of mixing speed) according to his needs and available equipment.

The treatment time for carrying out the contacting of the water to be purified and/or sludge and/or sediment to be dewatered with the at least one surface-treated calcium carbonate of step b) and/or the at least one phyllosilicate of step c) and the polymeric flocculation aid is carried out for a period in the range of several seconds to several minutes, e.g. 30 s or more, preferably 60 s or more, more preferably 90 s or more and most preferably for a period of 180 s or more. In general, the length of contacting the water and/or sludge and/or sediment to be treated with the at least one surface-treated calcium carbonate of step b) and/or the at least one phyllosilicate of step c) and the polymeric flocculation aid is determined by the degree of water pollution and the specific water and/or sludge and/or sediment to be treated.

In one embodiment of the present invention, process step d) and step e) are repeated one or more times. In a preferred embodiment of the present invention, process step d) or step e) is repeated one or more times. If step d) and step e) are repeated one or more times, step d) and step e) may be repeated independently, i.e. step d) may be repeated several times, while step e) is repeated more or less times than step d) and vice versa. For example, step d) may be repeated twice, while step e) is repeated once or more than twice.

Any polymeric flocculation aid known in the art can be used in the process of the present invention. Examples of preferred polymeric flocculation aids include polyacrylamides or polyelectrolytes based on polyacrylates, poly(diallyldimethylammonium chloride), polyethyleneimines, polyamines or mixtures of these, and natural polymers such as starch, or natural modified polymers like modified carbohydrates.

In one embodiment of the present invention, the polymeric flocculation aid is no polyacryl amide.

Preferably, the polymeric flocculation aid has a weight average molecular weight of at least 100,000 g/mole. In one embodiment of the present invention, the polymeric flocculation aid has a weight average molecular weight $M_w$ in the range from 100,000 to 10,000,000 g/mole, preferably in the range from 300,000 to 5,000,000 g/mole, more preferably in the range from 300,000 to 1,000,000 g/mole and most preferably in the range from 300,000 to 800,000 g/mole.

The polymeric flocculation aid can be ionic or non-ionic. Preferably, the polymeric flocculation aid is ionic, i.e. an anionic polymeric flocculation aid or a cationic polymeric flocculation aid.

In the context of the present invention, the term "cationic" refers to any polymer having a positive overall charge. Thus, the presence of some anionic monomer units is not excluded as long as there are still sufficient cationic monomer units providing a positive overall charge and enabling its use as a flocculation aid. Furthermore, the term "cationic polymeric flocculation aid" also comprises those polymers having monomer units with functional groups which become cationic upon addition to the water to be treated, e.g. amine groups becoming ammonium groups in acidic water.

The term "anionic" refers to any polymer having a negative overall charge. Thus, the presence of some cationic monomer units is not excluded as long as there are still sufficient anionic monomer units providing a negative overall charge and enabling its use as a flocculation aid. Furthermore, the term "anionic polymeric flocculation aid" also comprises those polymers having monomer units with functional groups which become anionic upon addition to the water to be treated, e.g. acid groups such as sulfonic acid groups.

A preferred polymeric flocculation aid of the present invention is polyacrylamide. By appropriate modifications which are known to the skilled person, the polyacrylamide can be used as a cationic polymeric flocculation aid as well as an anionic polymeric flocculation aid.

Preferably, the polyacrylamide contains at least 50 mol-%, more preferably at least 60 mol-%, even more preferably at least 75 mol-% monomer units derived from acrylamide.

An anionic polyacrylamide, i.e. a polyacrylamide having a negative overall charge, can be obtained by introducing appropriate comonomer units, e.g. derived from (meth) acrylic acid.

A cationic polyacrylamide, i.e. a polyacrylamide having a positive overall charge, can be obtained by introducing appropriate comonomer units, e.g. derived from aminoalkyl (meth)acrylates such as dimethylaminomethyl(meth)acrylate, dimethylaminoethyl(meth)acrylate, dimethylaminopropyl(meth)acrylate, diethylaminomethyl(meth)acrylate, diethylaminoethyl(meth)acrylate or diethylaminopropyl (meth)acrylate which can be quaternized by alkyl halides.

In one embodiment of the present invention, polyacrylate is used as a preferred polymeric flocculation aid in the process of the present invention. Preferably, the polyacrylate is used as a cationic polymeric flocculation aid. More specifically, the polyacrylate used as a cationic polymeric flocculation aid is free of acrylamide.

Preferably, the polyacrylate contains at least 50 mol-%, more preferably at least 60 mol-%, even more preferably at least 75 mol-% monomer units derived from aminoalkyl (meth)acrylates such as dimethylaminomethyl(meth)acrylate, dimethylaminoethyl(meth)acrylate, dimethylaminopropyl(meth)acrylate, diethylaminomethyl(meth)acrylate, diethylaminoethyl(meth)acrylate or diethylaminopropyl (meth)acrylate which can be quaternized by alkyl halides.

Alternatively, the polymeric flocculation aid may be a polymer as described as comb polymer in US 2009/0270543 A1. The subject-matter of US 2009/0270543 A1 relating to the polymer is hereby incorporated by reference in its entirety.

In one embodiment of the present invention, the polymeric flocculation aid is a copolymer prepared from 92 wt.-% methoxy polyethylene glycol methacrylate of molecular weight 2,000 g/mole and 8 wt.-% acrylic acid and at least partially neutralised by soda. In a further embodiment of the present invention, the polymeric flocculation aid is a copolymer prepared from 92 wt.-% methoxy polyethylene glycol methacrylate of molecular weight 2,000 g/mole and 8 wt.-% acrylic acid and totally neutralised by soda.

Optionally, further additives can be added to the water and/or sludge and/or sediment to be treated. These might include agents for pH adjustment and conventional flocculants such as polyaluminium chloride, iron chloride or aluminium sulphate. However, in one embodiment, the water purification process and/or dewatering process of sludge and/or sediment of the present invention does not use any additional conventional inorganic flocculation aids such as polyaluminium chloride, iron chloride or aluminium sulphate.

After the contacting/flocculation has been completed, the flocculated composite material can be removed from the treated water by conventional separation means known to the skilled person such as filtration, sedimentation and/or centrifugation.

In an alternative approach, the water to be purified and/or sludge and/or sediment to be dewatered is preferably passed through a permeable filter comprising the surface-treated calcium carbonate and/or the phyllosilicate and being capable of retaining, via size exclusion, the impurities on the filter surface as the filtrate is passed through by gravity and/or under vacuum and/or under pressure. This process is called "surface filtration".

In accordance with the present invention, the process for the purification of water and/or dewatering of sludge and/or sediment is suitable for effectively reducing the amount of polymeric flocculation aid contained in a purified water sample and/or dewatered sludge and/or sediment sample.

In one embodiment of the present invention, the water and/or sludge and/or sediment obtained by the process of the present invention contains an amount of polymeric flocculation aid of at least 10.0 wt.-%, preferably at least 20.0 wt.-%, more preferably at least 30.0 wt.-%, even more preferably at least 40.0 wt.-%, still more preferably at least 50.0 wt.-% and most preferably at least 60.0 wt.-% below the amount of free flocculation aid contained in corresponding water and/or sludge and/or sediment being treated the same way but in the absence of the at least one surface-treated calcium carbonate of step b) and the at least one phyllosilicate of step c). For example, the water and/or sludge and/or sediment obtained by the process of the present invention contains an amount of polymeric flocculation aid of at least 70.0 wt.-%, preferably at least 80.0 wt.-% and most preferably at least 90.0 wt.-% below the amount of free flocculation aid contained in corresponding water and/or sludge and/or sediment being treated the same way but in the absence of the at least one surface-treated calcium carbonate of step b) and the at least one phyllosilicate of step c).

The use of the inventive process for the purification of water and/or dewatering of sludges and/or sediments provides a number of improved properties. First of all, the inventive process provides excellent binding activity for impurities when the at least one surface-treated calcium carbonate of step b) and the at least one phyllosilicate of step c) are at least partially applied onto the surface of the water and/or sludge and/or sediment to be treated or mixed with the water and/or sludge and/or sediment to be treated. Furthermore, the use of the inventive process results in a composite material comprising at least one surface-treated calcium carbonate, at least one phyllosilicate and impurities which can be easily removed from the medium to be treated. Furthermore, the binding of impurities by the inventive process results in a good cleansing quality of the water and/or sludge and/or sediment to be treated. A further advantage of the inventive process resides in the fact that the used combination of surface-treated calcium carbonate and phyllosilicate lowers the amount of polymeric flocculation aid in the treated water and/or sludge and/or sediment and thus decreases the disturbance of the ecological balance.

Depending on the specific requirements and/or the respective physical and/or chemical properties of the water and/or sludge and/or sediment to be treated, the at least one surface-treated calcium carbonate of step b), the at least one phyllosilicate of step c) and the optional polymeric flocculation aid to be used according to the inventive process can be applied separately or a finished mixture may be used. In the form of a separately metered addition of the individual components of the surface-treated calcium carbonate, the at least one phyllosilicate and the optional polymeric flocculation aid, the concentration ratio may be individually adjusted depending on the present water and/or sludge and/or sediment to be treated. The water and/or sludge and/or sediment may be treated with the at least one surface-treated calcium carbonate of step b) and the at least one phyllosilicate of step c) being formulated, for example, as separate customary formulations, such as, for example, separate slurries, powders or granules. Alternatively, the at least one surface-treated calcium carbonate of step b) and the at least one phyllosilicate of step c) can be formulated, for example, as combined customary formulation, such as, for example, a slurry, a powder or granules.

Applications are possible for the purification of water and dewatering of sludges and/or sediments originated in different industries such as industrial waste water, drinking water, urban waste water, sludge such as harbour sludge, river sludge, coastal sludge or digested sludge, waste water or process water from breweries or other beverage industries, waste water or process water in the paper industry, colour-, paints-, or coatings industry, agricultural waste water, slaughterhouse waste water, leather industry waste water and leather tanning industry.

In one embodiment of the present invention, the at least one surface-treated calcium carbonate of step b) and the at least one phyllosilicate of step c) can also be advantageously used for neutralizing or buffering the water and/or sludge and/or sediment to be treated, such as industrial waste water, drinking water, urban waste water, sludge such as harbour sludge, river sludge, coastal sludge or digested sludge, waste water or process water from breweries or other beverage industries, waste water or process water in the paper industry, colour-, paints-, or coatings industry, agricultural waste water, slaughterhouse waste water, leather industry waste water and leather tanning industry.

In view of the very good results of the inventive process in the purification of water and/or dewatering of sludges and/or sediments as defined above, a further aspect of the present invention is the use of the combination of the phyllosilicate and the surface-treated calcium carbonate in the purification of water and/or dewatering of sludges and/or sediments. According to another aspect of the present invention, the use of the combination of the phyllosilicate and the surface-treated calcium carbonate for reducing the amount of polymeric flocculation aids in water and/or sludges and/or sediments is provided.

According to a further aspect of the present invention, a composite material comprising the at least one surface-treated calcium carbonate, the at least one phyllosilicate and impurities is provided.

Preferably, the composite material further comprises a polymeric flocculation aid as defined above. When the phyllosilicate and the surface-treated calcium carbonate are used in combination with a polymeric flocculation aid as defined above, it has surprisingly been found that a flocculated composite material of improved compactness is obtained while the concentration of polymeric flocculation aid in the filtrate is considerably reduced.

If the flocculated composite material is separated from the water and/or sludge and/or sediment by filtration, sedimentation and/or centrifugation, the composite material can be present in the form of a filter cake.

With regard to the definition of the surface-treated calcium carbonate, the phyllosilicate and preferred embodiments thereof, reference is made to the statements provided above when discussing the technical details of the process of the present invention.

The following examples may additionally illustrate the invention, but are not meant to restrict the invention to the exemplified embodiments.

EXAMPLES

Measurement Processes

The following measurement processes were used to evaluate the parameters given in the examples and claims.
BET Specific Surface Area of a Material The BET specific surface area was measured via the BET process according to ISO 9277 using nitrogen, following conditioning of the sample by heating at 250° C. for a period of 30 minutes. Prior to such measurements, the sample was filtered, rinsed and dried at 110° C. in an oven for at least 12 hours.

Particle size distribution (mass % particles with a diameter <x) and weight median diameter ($d_{50}$) of a particulate material Weight median grain diameter and grain diameter mass distribution of a particulate material were determined via the sedimentation process, i.e. an analysis of sedimentation behaviour in a gravitational field. The measurement was made with a Sedigraph™ 5100. The weight median particle diameter of the surface reacted calcium carbonate or the bentonite was determined by using a Malvern Mastersizer 2000 Ver. 5.4.

The processes and instruments are known to the skilled person and are commonly used to determine grain size of fillers and pigments. The measurements were carried out in an aqueous solution of 0.1 wt.-% $Na_4P_2O_7$. The samples were dispersed using a high speed stirrer and ultrasound.
Accessible Surface Area The accessible surface area of the calcium carbonate may be determined by the process described in the publication of Papirer, Schultz and Turchi (Eur. Polym. J., Vol. 20, No. 12, pp. 1155-1158, 1984).
Haze The haze of the water samples is measured by using a standard photometer in accordance with standard procedures.
pH Measurement The pH of the water samples is measured by using a standard pH-meter at approximately 25° C.
Alkalinity The alkalinity of the water samples is measured by using standard titration procedures.
Oxydizability The oxydizability of the water samples is measured by using the well known CSB method using potassium dichromate.

Example 1

The following illustrative Example involves the use of a mixture comprising surface-treated calcium carbonate and bentonite in combination with a polymeric flocculation aid for the purification of two different sludge samples. Said surface-treated calcium carbonate comprises a modified calcium carbonate and has a weight medium particle diameter $d_{50}$ value of 1.6 μm (measured according to the sedimentation process) and a specific surface area of 48 m$^2$/g (measured using nitrogen and the BET process), before surface treatment. The surface-treated calcium carbonate is covered by a coating comprising polyacrylate having a cationic charge density of 7 mEq/g. The polyacrylate is present in the coating in an amount of 0.95 wt.-%, based on the dry weight of the calcium carbonate. The combination of surface-treated calcium carbonate and bentonite was used in a mixture having a weight ratio of surface-treated calcium carbonate to bentonite of about 1:1. As the polymeric flocculation aid, the commercially available flocculation aid FLOPAM™ FB 608 (commercially available from SNF Floerger, France) was used.

The purification process was performed on a mixed sludge (a blend of a primary and biological sludge) sampled from STEP Collombey-Muraz and a digested sludge sampled from STEP AIEE Penthaz. 200 ml of the respective sludge sample was added to a slurry of surface-treated calcium carbonate and bentonite having a varying content of surface-treated calcium carbonate and bentonite. For example, the total content of surface-treated calcium carbonate and bentonite in the slurry was about 15 wt.-%, 25 wt.-%, 35 wt.-%, 45 wt.-% or 55 wt.-%, based on the total weight of the slurry. After manual agitation, the flocculation was completed by adding the polymeric flocculation aid. The polymeric flocculation aid was used in the form of a suspension having a content of flocculation aid of 0.5 wt.-%, based on the total weight of the suspension. The content of flocculation aid in the sample was monitored for the respective sludge samples.

During the purification process of the mixed sludge as well as for the digested sludge samples treated with a combination of a mixture of the surface-treated calcium carbonate and bentonite and a polymeric flocculation aid, a concentration reduction was obtained for the polymeric flocculation aid. Furthermore, a concentration reduction for the polymeric flocculation aid was observed for all slurries of surface-treated calcium carbonate and bentonite having varying content. It can thus be concluded that during the purification process a reduced amount of polymeric flocculation aid is needed.

Example 2

Example 2 was carried out in a similar manner as Example 1, with the exception that the surface-treated calcium carbonate comprises a ground calcium carbonate and has a weight medium particle diameter $d_{50}$ value of 2.3 μm (measured according to the sedimentation process) and a specific surface area of 28 m$^2$/g (measured using nitrogen and the BET process), before surface treatment. The surface-treated calcium carbonate is covered by a coating comprising polyacrylate having a cationic charge density of 7 mEq/g. The polyacrylate is present in the coating in an amount of 0.95 wt.-% based on the dry weight of the calcium carbonate.

As for Example 1, a concentration reduction for the polymeric flocculation aid was also obtained for Example 2.

Example 3

The following illustrative Example involves the use of a surface-treated calcium carbonate and bentonite in combination with a polymeric flocculation aid for the purification of two different sludge samples. The bentonite was first added to the sludge samples followed by the surface-treated calcium carbonate. Said surface-treated calcium carbonate comprises a modified calcium carbonate and has a weight medium particle diameter $d_{50}$ value of 1.7 μm (measured according to the sedimentation process) and a specific surface area of 51 m$^2$/g (measured using nitrogen and the BET process), before surface treatment. The surface-treated calcium carbonate is covered by a coating comprising polyacrylate having a cationic charge density of 7 mEq/g. The polyacrylate is present in the coating in an amount of 0.95 wt.-% based on the dry weight of the calcium carbonate. The surface-treated calcium carbonate and bentonite were used in a weight ratio of surface-treated calcium carbonate to bentonite of about 1:1. As the polymeric flocculation aid, the commercially available flocculation aid FLOPAM™ FB 608 (commercially available from SNF Floerger, France) was used.

The purification process was performed on a mixed sludge (a blend of a primary and biological sludge) sampled from STEP Collombey-Muraz and a digested sludge sampled from STEP AIEE Penthaz. A slurry of bentonite having a varying content of bentonite was added to 200 ml of the respective sludge sample. For example, the content of bentonite in the slurry was about 15 wt.-%, 25 wt.-%, 35 wt.-%, 45 wt.-% or 55 wt.-%, based on the total weight of the slurry. After the complete addition and manual agitation of the bentonite slurry, each obtained slurry comprising the sludge/bentonite mixture was contacted with a slurry of surface-treated calcium carbonate having varying content of surface-treated calcium carbonate. For example, the content of surface-treated calcium carbonate in the slurry was about 15 wt.-%, 25 wt.-%, 35 wt.-%, 45 wt.-% or 55 wt.-%, based on the total weight of the slurry. After manual agitation, the flocculation was completed by adding the polymeric flocculation aid. The polymeric flocculation aid was used in the form of a suspension having a content of flocculation aid of 0.5 wt.-%, based on the total weight of the suspension. The content of flocculation aid in the sample was monitored for the respective sludge samples.

During the purification process of the mixed sludge as well as for the digested sludge samples treated with bentonite first followed by the surface-treated calcium carbonate, and a polymeric flocculation aid, a concentration reduction was obtained for the polymeric flocculation aid. Furthermore, a concentration reduction for the polymeric flocculation aid was observed for all contents of bentonite and surface-treated calcium carbonate. It can thus be concluded that during the purification process a reduced amount of polymeric flocculation aid is needed.

Example 4

Example 4 was carried out in a similar manner as Example 3, with the exception that the surface-treated calcium carbonate comprises a ground calcium carbonate and has a weight medium particle diameter $d_{50}$ value of 1.7 μm (measured according to the sedimentation process) and a specific surface area of 38 m$^2$/g (measured using nitrogen and the BET process), before surface treatment. The surface-treated calcium carbonate is covered by a coating comprising polyacrylate having a cationic charge density of 7 mEq/g. The polyacrylate is present in the coating in an amount of 0.95 wt.-%, based on the dry weight of the calcium carbonate.

As for Example 3, a concentration reduction for the polymeric flocculation aid was also obtained for Example 4.

Example 5

The following illustrative Example involves the use of a modified calcium carbonate, i.e. the calcium carbonate is not covered by a coating comprising at least one cationic polymer, in combination with a polymeric flocculation aid but in the absence of bentonite for the purification of two different sludge samples. Said modified calcium carbonate has a weight medium particle diameter $d_{50}$ value of 1.6 µm (measured according to the sedimentation process) and a specific surface area of 45 m$^2$/g (measured using nitrogen and the BET process), before surface treatment. As the polymeric flocculation aid, the commercially available flocculation aid FLOPAM® FB 608 (commercially available from SNF Floerger, France) was used.

The purification process was performed on a mixed sludge (a blend of a primary and biological sludge) sampled from STEP Collombey-Muraz and a digested sludge sampled from STEP AIEE Penthaz. 200 ml of the respective sludge sample was added to a slurry of modified calcium carbonate having a content of surface-treated calcium carbonate of 31.8 wt.-%, based on the total weight of the slurry. After manual agitation, the flocculation was completed by adding the polymeric flocculation aid. The polymeric flocculation aid was used in the form of a suspension having a content of flocculation aid of 0.5 wt.-%, based on the total weight of the suspension. The content of polymeric flocculation aid in the sample was monitored for the respective sludge samples.

During the purification process of the mixed sludge as well as for the digested sludge samples treated with a combination of the modified calcium carbonate and a polymeric flocculation aid, only a slight concentration reduction for the polymeric flocculation aid was obtained.

Overall, it can be concluded that the use of the modified calcium carbonate in combination with a polymeric flocculation aid but in the absence of bentonite has only slight effects on the amounts of polymeric flocculation aid required for complete flocculation.

Example 6

The following illustrative Example involves the use of different amounts of a mixture comprising surface-treated calcium carbonate and bentonite in combination with a polymeric flocculation aid for the purification of river water. Said surface-treated calcium carbonate comprises a modified calcium carbonate and has a weight medium particle diameter $d_{50}$ value of 2.0 µm (measured according to the sedimentation process) and a specific surface area of 56 m$^2$/g (measured using nitrogen and the BET process), before surface treatment. The surface-treated calcium carbonate is covered by a coating comprising poly(diallyldimethylammonium chloride) having a cationic charge density of 6.2 mEq/g. The poly(diallyldimethylammonium chloride) is present in the coating in an amount of 1.5 wt.-%, based on the dry weight of the calcium carbonate. The combination of surface-treated calcium carbonate and bentonite was used in a mixture having a weight ratio of surface-treated calcium carbonate to bentonite of about 1:1. As the polymeric flocculation aid, the commercially available flocculation aid Nerolan AG 580 (commercially available from Nerolan Wassertechnik GmbH, Germany) was used. Nerolan AG 580 represents a polyacrylate which is free of acrylamide.

As a comparative Example, aluminum sulfate in combination with a polyacrylamide as the polymeric flocculation aid was used. As the polymeric flocculation aid, the commercially available flocculation aid Praestol 650 TR (commercially available from Ashland Deutschland GmbH, Germany) was used.

The purification process was performed on river water of the Neva in Russia sampled from a water barrage. Differing amounts of the mixture comprising the surface-treated calcium carbonate and bentonite and 10 ppm of aluminum sulfate, respectively, was added to about 450 ml of the water sample. After agitation at 400 U/min for about 30 s, the flocculation was completed by adding the respective polymeric flocculation aid. Overall, it can be concluded that the use of a mixture comprising the surface-treated calcium carbonate and bentonite in combination with a polymeric flocculation aid has a positive effect on the quality of the water obtained by the purification process.

Example 7

Example 7 was carried out in a similar manner as Example 6, with the exception that the surface-treated calcium carbonate comprises a ground calcium carbonate and has a weight medium particle diameter $d_{50}$ value of 1.8 µm (measured according to the sedimentation process) and a specific surface area of 23 m$^2$/g (measured using nitrogen and the BET process), before surface treatment. The surface-treated calcium carbonate is covered by a coating comprising polyacrylate having a cationic charge density of 6 mEq/g. The polyacrylate is present in the coating in an amount of 0.95 wt.-%, based on the dry weight of the calcium carbonate.

As for Example 6, a positive effect on the quality of the water was also obtained for Example 7.

The invention claimed is:

1. A process for one or more of purification of water, dewatering of sludge and dewatering of sediment, comprising the following steps of:
    a) providing one or more of water to be purified, sludge to be dewatered and sediment to be dewatered comprising impurities;
    b) providing at least one surface-treated calcium carbonate, wherein at least 1% of the accessible surface area of the calcium carbonate is covered by a coating comprising at least one cationic polymer, wherein the at least one cationic polymer is present in the coating in an amount of 0.2 wt.-% to 10 wt.-%, based on the dry weight of the calcium carbonate,
    c) providing at least one phyllosilicate, wherein the phyllosilicate is bentonite with a montmorillonite content of at least 50 wt.-% based on the total weight of the bentonite, and
    d) contacting one or more of the water, sludge and sediment of step a) with the at least one surface-treated calcium carbonate of step b) and the at least one phyllosilicate of step c) to obtain a composite material comprising the at least one surface-treated calcium carbonate, the at least one phyllosilicate and impurities.

2. The process according to claim 1, wherein one or more of the water, sludge and sediment of step a) is selected from the group consisting of industrial waste water, drinking water, urban waste water, sludge, harbour sludge, river sludge, coastal sludge or digested sludge, waste water, process water from a brewery or other beverage industry, waste water or process water in paper industry, waste water or process waste in colour, paint, or coating industry, agricultural waste water, slaughterhouse waste water, leather industry waste water, and leather tanning industry waste water.

3. The process according to claim 1, wherein the at least one surface-treated calcium carbonate of step b) comprises ground calcium carbonate, precipitated calcium carbonate, surface-modified calcium carbonate, or any mixture thereof.

4. The process according to claim 1, wherein the at least one surface-treated calcium carbonate of step b) is surface-modified calcium carbonate.

5. The process according to claim 1, wherein the at least one surface-treated calcium carbonate of step b) is ground calcium carbonate.

6. The process according to claim 5, wherein ground calcium carbonate (GCC) is obtained from marble, chalk, calcite, dolomite, limestone, any any mixture thereof.

7. The process according to claim 1, wherein the at least one surface-treated calcium carbonate of step b) is precipitated calcium carbonate (PCC).

8. The process according to claim 7, wherein the precipitated calcium carbonate (PCC) is in one or more of aragonitic, vateritic and calcitic mineralogical crystal forms.

9. The process according to 1, wherein the at least one cationic polymer:
   a) has a positive charge density in the range of 1 mEq/g and 15 mEq/g, and
   b) has at least 60% of its monomer units having a cationic charge, and
   c) has a weight average molecular weight $M_w$ of below 1,000,000 g/mole, and
   d) is a homopolymer based on monomer units selected from the group consisting of diallyldialkyl ammonium salts, tertiary and quaternized amines, quaternized imines, acrylamide, methacrylamide, N,N-dimethyl acrylamide, acrylic acid, methacrylic acid, vinylsulfonic acid, vinyl pyrrolidone, hydroxyl ethyl acrylate, styrene, methyl methacrylate and vinyl acetate, or
   e) is a copolymer based on monomer units selected from the group consisting of diallyldialkyl ammonium salts and methacrylic acid, and comonomer units selected from the group consisting of acrylamide, methacrylamide, N,N-dimethyl acrylamide, acrylic acid, methacrylic acid, vinylsulfonic acid, vinyl pyrrolidone, hydroxyl ethyl acrylate, styrene, methyl methacrylate, vinyl acetate and any mixture thereof.

10. The process according to 1, wherein the at least one cationic polymer
   a) has a positive charge density in the range of 2.5 mEq/g and 12.5 mEq/g, and
   b) has at least 70% of its monomer units having a cationic charge, and
   c) has a weight average molecular weight $M_w$ of from 50,000 to 750,000 g/mole, and
   d) is a homopolymer based on monomer units of diallyldialkyl ammonium salts and acrylic acid, or
   e) is a copolymer based on monomer units of diallyldialkyl ammonium salts and methacrylic acid, and comonomer units selected from the group consisting of acrylamide and acrylic acid.

11. The process according to 1, wherein the at least one cationic polymer
   a) has a positive charge density in the range of 5 µEq/g and 10 mEq, and
   b) has at least 80% of its monomer units having a cationic charge, and
   c) has a weight average molecular weight $M_w$ of from 50,000 to 650,000 g/mole.

12. The process according to 1, wherein the at least one cationic polymer:
   a) has a positive charge density in the range of 5 µEq/g and 10 mEq/g, and
   b) has at least 90% of its monomer units having a cationic charge, and
   c) has a weight average molecular weight $M_w$ of from 100,000 to 300,000 g/mole.

13. The process according to 1, wherein the at least one cationic polymer:
   a) has a positive charge density in the range of 5 µEq/g and 10 mEq/g, and
   b) has 100% of its monomer units having a cationic charge, and
   c) has a weight average molecular weight $M_w$ of from 50,000 to 650,000 g/mole.

14. The process according to claim 1, wherein at least 10% of the accessible surface area of the calcium carbonate is covered by a coating comprising the cationic polymer.

15. The process according to claim 1, wherein at least 20% of the accessible surface area of the calcium carbonate is covered by a coating comprising the cationic polymer.

16. The process according to claim 1, wherein at least 30% of the accessible surface area of the calcium carbonate is covered by a coating comprising the cationic polymer.

17. The process according to claim 1, wherein at least 40% of the accessible surface area of the calcium carbonate is covered by a coating comprising the cationic polymer.

18. The process according to claim 1, wherein at least 50% of the accessible surface area of the calcium carbonate is covered by a coating comprising the cationic polymer.

19. The process according claim 1, wherein the at least one phyllosilicate is bentonite.

20. The process according to claim 1, wherein the bentonite further comprises one or more of concomitant minerals, quartz, mica, kaolinite, feldspar, pyrite, calcite, and cristobalite.

21. The process according to claim 1, wherein contacting step d) is carried out by adding the at least one phyllosilicate of step c) to one or more of the water, sludge and sediment of step a) before adding the at least one surface-treated calcium carbonate of step b) to one or more of the water, sludge and sediment of step a).

22. The process according to claim 1, wherein contacting step d) is carried out by adding a mixture comprising i) the at least one surface-treated calcium carbonate of step b) and ii) the at least one phyllosilicate of step c) to one or more of the water, sludge and sediment of step a).

23. The process according to claim 1, wherein contacting step d) is carried out by adding the at least one surface-treated calcium carbonate of step b) and the at least one phyllosilicate of step c) to one or more of the water, sludge and sediment of step a) in a weight ratio of the at least one surface-treated calcium carbonate: the at least one phyllosilicate from 10:1 to 1:10.

24. The process according to claim 1, wherein contacting step d) is carried out by adding the at least one surface-treated calcium carbonate of step b) and the at least one phyllosilicate of step c) to one or more of the water, sludge and sediment of step a) in a weight ratio of the at least one surface-treated calcium carbonate: the at least one phyllosilicate from 5:1 to 1:5.

25. The process according to claim 1, wherein contacting step d) is carried out by adding the at least one surface-treated calcium carbonate of step b) and the at least one phyllosilicate of step c) to one or more of the water, sludge and sediment of step a) in a weight ratio of the at least one surface-treated calcium carbonate: the at least one phyllosilicate from 2:1 to 1:2.

26. The process according to claim 1, wherein contacting step d) is carried out by one or more of
   i) at least partially covering the surface of one or more of the water, sludge and sediment to be treated of step a) with the at least one surface-treated calcium carbonate of step b) and the at least one phyllosilicate of step c), and
   ii) mixing the one or more of water, sludge and sediment to be treated of step a) with the at least one surface-treated calcium carbonate of step b) and the at least one phyllosilicate of step c).

27. The process according to claim 1, which further comprises the addition of a polymeric flocculation aid.

* * * * *